(12) United States Patent
Yanagihara et al.

(10) Patent No.: US 6,172,989 B1
(45) Date of Patent: Jan. 9, 2001

(54) TRANSMITTING APPARATUS AND METHOD, RECEIVING APPARATUS AND METHOD

(75) Inventors: Naofumi Yanagihara, Tokyo; Mari Horiguchi, Kanagawa; Makoto Sato, Tokyo; Ichiro Hamada; Takehiko Nakano, both of Kanagawa, all of (JP)

(73) Assignee: Sony Corporation, Tokyo (JP)

( * ) Notice: Under 35 U.S.C. 154(b), the term of this patent shall be extended for 0 days.

(21) Appl. No.: 08/954,757

(22) Filed: Oct. 20, 1997

(30) Foreign Application Priority Data

Oct. 22, 1996 (JP) .................................. 8-279273
May 30, 1997 (JP) .................................. 9-141426

(51) Int. Cl.[7] .................................................. H04J 3/24
(52) U.S. Cl. ..................................... 370/473; 370/476
(58) Field of Search ................... 370/352, 353, 370/354, 355, 356, 466, 470, 471, 472, 473, 474, 475, 476

(56) References Cited

U.S. PATENT DOCUMENTS

| | | | |
|---|---|---|---|
| 5,646,941 | * 7/1997 | Nishimura et al. | ................. 370/389 |
| 5,652,749 | * 7/1997 | Davenport et al. | ................. 370/466 |
| 5,802,017 | * 9/1998 | Sato et al. | ................. 369/2 |
| 5,802,068 | * 9/1998 | Kudo | ................. 370/538 |

* cited by examiner

Primary Examiner—Huy D. Vu
Assistant Examiner—Alexander Boakye
(74) Attorney, Agent, or Firm—Frommer, Lawrence & Haug, LLP.; William S. Frommer; Bruno Polito

(57) ABSTRACT

A transmitting apparatus and method, and a receiving apparatus and method for communicating a pack of 2,048 bytes using the digital interface in accordance with the IEEE 1394 standard. A 4-byte time stamp is added to a 2,048-byte pack of MPEG (Moving Picture Experts Group)-PS (program stream) data. Also, 124 bytes of padding data is added to this pack in order that the overall byte length of data be a multiple of 16. Then the data is divided into a number of fractions which is a multiple of 2 (e.g., 32), thereby being converted into a number of data blocks equal to the number of fractions. Each data block has a byte length of a multiple of 4 (e.g., 68 bytes). A CIP header and the like are added to a predetermined number of the data blocks to form a packet.

68 Claims, 24 Drawing Sheets

FIG. 5

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | \multicolumn{2}{SID} | \multicolumn{6}{DBS} | FN | \multicolumn{3}{QPC} | SPH | RSV | \multicolumn{8}{DBC} |
| | 0 | 0 | 0 | 0 | 0 | 0 | 0 | 0 | 0 | 0 | 0 | 1 | 0 | 0 | 0 | 1 | 0 | 0 | 0 | 0 | 0 | 1 | | | | | | | | | | |
| | \multicolumn{2}{FMT} | | | | | | | RSV | \multicolumn{6}{newFN} | \multicolumn{7}{newQPC} | \multicolumn{10}{FDF} |
| | 1 | 0 | 1 | 0 | 0 | 1 | 0 | 0 | | 1 | 0 | 1 | 0 | 0 | 0 | 1 | 0 | 0 | 0 | 1 | 1 | 1 | | | | | | | | | | |

FIXED AT ZERO (NOT USED): bits 17-21

ONE QUADLET

FIG. 6

| FMT (BINARY) | DESCRIPTION |
|---|---|
| 000000 | DVCR |
| 000001<br>:<br>011101 | RESERVED |
| 011110 | FREE (VENDOR UNIQUE) |
| 011111 | RESERVED |
| 100000 | MPEG-TS |
| 100001 | (DSS) |
| 100010<br>:<br>100011 | RESERVED |
| 100100 | MPEG-PS |
| 100101<br>:<br>111101 | RESERVED |
| 111110 | FREE (VENDOR UNIQUE) |
| 111111 | NO DATA |

FIG. 9

| No. of DBs per packet \ No. of fractions | 1 | 2 | 3 | 4 | 5 | 6 | 7 | 8 | 16 | 32 | 64 |
|---|---|---|---|---|---|---|---|---|---|---|---|
| «64 fractions»<br>Padding: 252 bytes<br>DVD net: 32 bytes<br>IDB size: 36 bytes | Transmission rate 2.0 Mbps<br>Band 704 units | Transmission rate 4.1 Mbps<br>Band 848 units | Transmission rate 6.1 Mbps<br>Band 992 units | Transmission rate 8.2 Mbps<br>Band 1136 units | Transmission rate 10.2 Mbps<br>Band 1280 units | Transmission rate 12.3 Mbps<br>Band 1424 units | Transmission rate 14.3 Mbps<br>Band 1568 units | Transmission rate 16.4 Mbps<br>Band 1712 units | Transmission rate 32.8 Mbps<br>Band 2864 units | Transmission rate 65.5 Mbps<br>Band 5168 units | Transmission rate 131.1 Mbps<br>Band 9776 units |
| «32 fractions»<br>Padding: 124 bytes<br>DVD net: 64 bytes<br>IDB size: 68 bytes | Transmission rate 4.1 Mbps<br>Band 832 units | Transmission rate 8.2 Mbps<br>Band 1104 units | Transmission rate 12.3 Mbps<br>Band 1376 units | Transmission rate 16.4 Mbps<br>Band 1648 units | Transmission rate 20.5 Mbps<br>Band 1920 units | Transmission rate 24.6 Mbps<br>Band 2192 units | Transmission rate 28.7 Mbps<br>Band 2464 units | Transmission rate 32.8 Mbps<br>Band 2736 units | Transmission rate 65.5 Mbps<br>Band 4912 units | Transmission rate 131.1 Mbps<br>Band 9264 units | |
| «16 fractions»<br>Padding: 60 bytes<br>DVD net: 128 bytes<br>IDB size: 132 bytes | Transmission rate 8.2 Mbps<br>Band 1088 units | Transmission rate 16.4 Mbps<br>Band 1616 units | Transmission rate 24.6 Mbps<br>Band 2144 units | Transmission rate 32.8 Mbps<br>Band 2672 units | Transmission rate 40.9 Mbps<br>Band 3200 units | Transmission rate 49.2 Mbps<br>Band 3728 units | Transmission rate 57.3 Mbps<br>Band 4256 units | Transmission rate 65.5 Mbps<br>Band 4784 units | Transmission rate 131.1 Mbps<br>Band 9008 units | | |
| «8 fractions»<br>Padding: 28 bytes<br>DVD net: 256 bytes<br>IDB size: 260 bytes | Transmission rate 16.4 Mbps<br>Band 1600 units | Transmission rate 32.8 Mbps<br>Band 2640 units | Transmission rate 49.2 Mbps<br>Band 3680 units | Transmission rate 65.5 Mbps<br>Band 4720 units | Transmission rate 81.9 Mbps<br>Band 5760 units | Transmission rate 98.3 Mbps<br>Band 6800 units | Transmission rate 114.7 Mbps<br>Band 7840 units | Transmission rate 131.1 Mbps<br>Band 8880 units | | | |

FIG. 12

| No. of fractions \ No. of DBs per packet | 1 | 2 | 4 | 8 | 16 | 32 | 64 |
|---|---|---|---|---|---|---|---|
| ⟪6 × 8 fractions⟫<br>Padding : 40 bytes<br>DVD net: 42.66 bytes<br>IDB size : 44 bytes | Transmission rate 2.7 Mbps<br>Band 736 units | Transmission rate 5.5 Mbps<br>Band 912 units | Transmission rate 11.0 Mbps<br>Band 1264 units | Transmission rate 22.0 Mbps<br>Band 1968 units | Transmission rate 44.0 Mbps<br>Band 3376 units | Transmission rate 88.1 Mbps<br>Band 6192 units | Transmission rate 176.1 Mbps<br>Band 11824 units |

FIG. 14

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|---|---|---|---|---|---|---|---|---|---|---|---|---|---|---|
| | SID | | | | | | | | DBS | | | | | | | FN | | QPC | | | SPH | RSV | | DBC | | | | | | | |
| | 0 | 0 | | | | | | | 0 | 0 | 0 | 0 | 0 | 1 | 0 | 0 | 0 | 0 | 0 | 0 | 0 | 0 | 0 | | | | | | | | |
| | FIM | | SID | | | | | | RSV | newDBS | | | | FDF RSV | | | | | | | | | SYT | | | | | | | | |
| | 1 | 0 | 1 | 0 | 0 | 1 | 0 | 0 | 0 | 1 | 1 | 0 | | | | | | | | | | | | | | | | | | | | |

← ONE QUADLET →

FIG. 15

| No. of DBs per packet / No. of fractions | 1 | 2 | 3 | 4 | 5 | 6 | 7 | 8 |
|---|---|---|---|---|---|---|---|---|
| 《64 fractions》<br>Padding: 0 byte<br>DVD net: 32 bytes<br>IDB size: 32 bytes | Transmission rate 2.1 Mbps<br>Band 688 units | Transmission rate 4.1 Mbps<br>Band 816 units | Transmission rate 6.1 Mbps<br>Band 944 units | Transmission rate 8.2 Mbps<br>Band 1072 units | Transmission rate 10.2 Mbps<br>Band 1200 units | Transmission rate 12.3 Mbps<br>Band 1328 units | Transmission rate 14.3 Mbps<br>Band 1456 units | Transmission rate 16.4 Mbps<br>Band 1584 units |

FIG. 19

| ITEM | CONTENT | VALUE | NOTE |
|---|---|---|---|
| SID | ACCORDING TO CONFIGURATION | xxxxxx | Source node ID |
| DBS | 9 QUADLETS (36B) | 00001001 | Data Block Size in quadlets |
| FN | DIVISION INTO 8 FRACTIONS | 11 | Fraction Number |
| QPC | 7 QUADLETS (28B) | 111 | Quadlet Padding Count |
| SPH | EXISTING | 1 | Source Packet Header |
| DBC | 0 ~ 225 | 0-0xFF | Data Block Counter |
| FMT | MPEG2-PS | 100001 | For MaT |
| FDF | AS DESIRED | UNDETERMINED | Format Dependent Field |

FIG. 23

| | SID | DBS | FN | QPC | SPH | RSV | DBC |
|---|---|---|---|---|---|---|---|
| 0 0 | | | | | | | |

| | FMT | FDF | | | | SYT | |
|---|---|---|---|---|---|---|---|
| 1 0 | | | | | | | |

FIG. 24

| FMT (BINARY) | DESCRIPTION |
|---|---|
| 000000 | DVCR |
| 000001 ⋮ 011101 | RESERVED |
| 011110 | FREE (vendor unique) |
| 011111 | RESERVED |
| 100000 | MPEG |
| 100001 | (DSS) |
| 100010 ⋮ 111101 | RESERVED |
| 111110 | FREE (vendor unique) |
| 111111 | NO DATA |

FIG. 25

| SYT (BINARY) | | DESCRIPTION |
|---|---|---|
| X X X X | 0 0 0 0 0 0 0 0 0 0 0 0 ⋮ 1 0 1 1 1 1 1 1 1 1 1 1 | TIME STAMP |
| X X X X | | |
| X X X X | 1 1 0 0 0 0 0 0 0 0 0 0 ⋮ 1 1 1 1 1 1 1 1 1 1 1 0 | RESERVED |
| X X X X | | |
| 0 0 0 0 ⋮ 1 1 1 0 | 1 1 1 1 1 1 1 1 1 1 1 1 ⋮ 1 1 1 1 1 1 1 1 1 1 1 1 | RESERVED |
| 1 1 1 1 | 1 1 1 1 1 1 1 1 1 1 1 1 | NO INFORMATION |

FIG. 26

| SID | DBS | FN | QPC | SPH | RSV | DBC |
|---|---|---|---|---|---|---|
| FMT | FDF | | | | | |

| 0 | 0 |
|---|---|
| 0 | 1 |

US 6,172,989 B1

TRANSMITTING APPARATUS AND METHOD, RECEIVING APPARATUS AND METHOD

BACKGROUND OF THE INVENTION

1. Field of the Invention

The present invention relates to a transmitting apparatus and method, and a receiving apparatus and method, and, more particularly, to a transmitting apparatus and method and a receiving apparatus and method for transmitting or receiving a pack of 2,048 bytes through the digital interface in accordance with the IEEE 1394 standard.

2. Description of the Related Art

The DVD (digital versatile disc)-Video (hereinafter referred to simply as DVD) has recently been standardized. It is expected to be used widely. In the DVD, video data is recorded by being compressed in the MPEG (Moving Picture Experts Group)-PS (program stream) form. A DVD player reproduces, in its drive section, data from the DVD, and decodes, in its decoding section, the data in the MPEG program stream form reproduced from the DVD. The DVD player outputs the decoded data to a television receiver or the like to display images corresponding to the data.

It is possible that a television receiver having, for example, a function of decoding MPEG-PS-encoded data will be developed. In such a case, it is conceivable that a DVD player and a television receiver having such a decoding function are connected to each other through an AV bus, and a bit stream in an encoded state is output from the DVD player and is supplied via the AV bus to the television receiver having the decoding function to be decoded on the television receiver side.

A system has been conceived in which a DVD player and a television receiver are connected through an AV bus as described above, and in which an interface in accordance with the IEEE (The Institute of Electrical and Electronic Engineers) 1394 High Performance Serial Bus standard is used to perform data communication.

FIG. 20 shows an example of the relationship between original data and actually transmitted packets in isochronous communication in accordance with the IEEE 1394 standard.

As shown in FIG. 20, a 4-byte source packet header and padding data for controlling the data length are added to each of source packets, which are original data, and each packet is thereafter divided into a predetermined number of data blocks. The unit of data in each transmitted packet is one quadlet (=four bytes). Therefore, the byte length of each of data blocks, various headers and so on is set to a multiple of 4.

FIG. 21 shows the format of the source packet header. As 25 bits in the header, a time stamp which is used to suppress jitter, for example, when MPEG-TS (transport stream) data used in digital satellite broadcasting or the like is transmitted in isochronous communication is written.

Such a packet header, a common isochronous packet (CIP) header (described below) and any other sort of data are added to a predetermined number of data blocks, thus forming a packet.

FIG. 22 shows the structure of a packet for isochronous communication. An isochronous communication packet is formed of a packet header, a header cyclic redundancy check (header CRC), a data field and a data cyclic redundancy check (data CRC).

The packet header is formed of "Data_Length" at representing the data length, "Tag" representing the kind of format of the corresponding packet (presence/absence of a CIP header or the like), "Channel" representing the number of a channel in which the packet is transmitted one of 0 to 63), "tcode" representing a code for processing, and a sync code Sy prescribed according to each of applications. The header CRC (Header_CRC) is a packet header error detection code, and the data CRC (Data_CRC) is a data field (Data field) error detection code. The data field is formed of a CIP header and real time data. Real time data in the data field is essential data to be transmitted (the above-mentioned data blocks).

Figure 23:
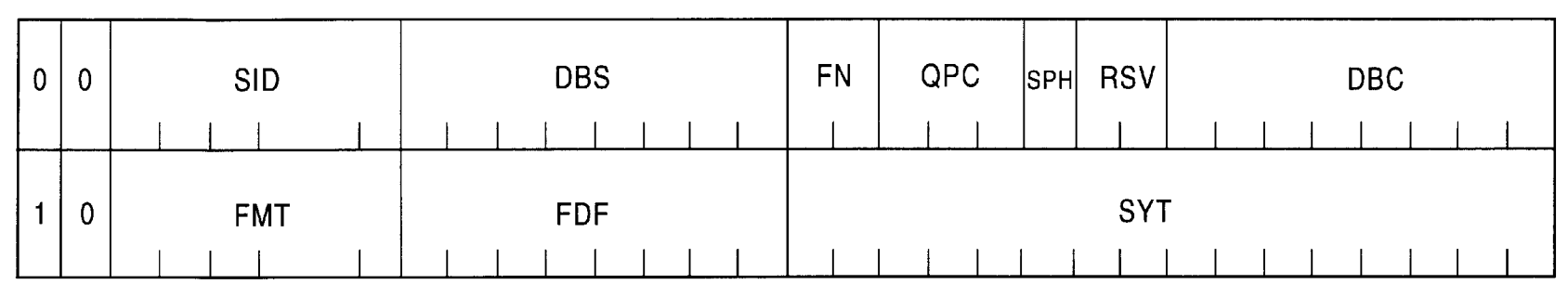

FIG. 23 shows the format of a CIP header having an SYT area provided for synchronization of frames of a video signal. This CIP header is formed of an SID (source node ID) area for a transmission node number, a DBS (data block size) area for the length of a data block, an FN (fraction number) area for the number of fractions into which data is divided to form a packet, a QPC (quadlet padding count) area for the number of quadlets of padding data, an SHP area for a flag indicating the presence/absence of a source packet header, a DBC (data block counter) area for detecting a lacuna in the packet, an FMT area for a signal format representing the sort of transmitted data, a FDF (format dependent field) area used according to the signal format, and an SYT (sync time) area.

An area rev is provided as a reserved area.

Such a CIP header having an SYT area is used, for example, when data of a digital camera-recorder is transmitted.

FIG. 24 shows the relationship between the value in the FMT area and sorts of data. For example, if DVCR (digital video cassette recorder) data is transmitted, the value in the FMT area is set to 000000 (binary). If MPEG data (MPEG-TS data) is transmitted, the value in the FMT area is set to 100000 (binary).

FIG. 25 shows the format of the SYT area. As shown in FIG. 25, lower 12 bits in 16 bits in the SYT area represent a time stamp.

FIG. 26 shows the format of a CIP header having no SYT area. In this CIP header, the SYT area in the CIP header shown in FIG. 23 is used as an FDF area.

As described above, packets for isochronous communication are formed in accordance with formats corresponding to various sorts of data to be transmitted. For example, MPEG-TS data can also be transmitted in isochronous communication as well as DVCR data transmitted in isochronous communication as described in Japanese Patent Laid-Open No. 350649/1994.

However, communication of MPEG-PS data has not been performed by using the digital interface in accordance with the IEEE 1394 standard; it is difficult to perform communication of MPEG-PS data by using the digital interface in accordance with the IEEE 1394 standard.

That is, in MPEG-PS data, the pack forming a unit of data has a length of 2,048 bytes, which is much longer than that of the pack of MPG-TS data (188 bytes). Correspondingly, the number of fractions into which data is divided to form a packet is large. However, since only two bits are assigned to the FN area of the CIP header in which the number of fractions is written, the number of fractions is limited to 1 ($=2^0$), 2 ($=2^1$), 4 ($=2^2$), and 8 ($=2^3$), and it is difficult to increase the number of fractions above 8.

The above-mentioned padding data for MPEG-PS, data is usually longer than, for example, that for MPEG-TS data, but only three bits are assigned to the QPC area of the above-described CIP header. Therefore, it is difficult to use padding data equal to or larger than 8 quadlets.

SUMMARY OF THE INVENTION

In view of the above-described circumstances, an object of the present invention is to provide a transmitting apparatus and method, and a receiving apparatus and method for performing communication of a pack of 2,048 bytes using the digital interface in accordance with the IEEE 1394 standard in such a manner that the pack of 2,048 bytes is converted into a packet transmitted in isochronous communication in accordance with the IEEE 1394 standard.

To achieve this object, according to a first aspect of the present invention, there is provided a transmitting apparatus comprising conversion means for converting a pack of 2,048 bytes in data into at least one packet to be transmitted in isochronous communication in accordance with the IEEE 1394 standard, and transmitting means for transmitting the packet.

According to a second aspect of the present invention, there is provided a transmitting method comprising the steps of converting a pack of 2,048 bytes in data into at least one packet to be transmitted in isochronous communication in accordance with the IEEE 1394 standard, and transmitting the packet.

According to a third aspect of the present invention, there is provided a receiving apparatus comprising receiving means for receiving packets transmitted in isochronous communication in accordance with the IEEE 1394 standard, and restoration means for restoring a pack of 2,048 byte from at least one of the packets received by the receiving means.

According to a fourth aspect of the present invention, there is provided a receiving method comprising the steps of receiving packets transmitted in isochronous communication in accordance with the IEEE 1394 standard, and restoring a pack of 2,048 byte from at least one of the received packets.

In the transmitting apparatus in the first aspect of the present invention, the conversion means converts a pack of 2,048 bytes in data into at least one packet to be transmitted in isochronous communication in accordance with the IEEE 1394 standard, and the transmitting means transmits the packet.

In the transmitting method in the second aspect of the present invention, a pack of 2,048 bytes in data is converted into at least one packet to be transmitted in isochronous communication in accordance with the IEEE 1394 standard, and the packet is transmitted.

In the receiving apparatus in the third aspect of the present invention, the receiving means receives packets transmitted in isochronous communication in accordance with the IEEE 1394 standard, and the restoration means restores a pack of 2,048 byte from at least one of the packets received by the receiving means.

In the receiving method in the fourth aspect of the present invention, packets transmitted in isochronous communication in accordance with the IEEE 1394 standard are received, and a pack of 2,048 byte is restored from at least one of the received packets.

BRIEF DESCRIPTION OF THE DRAWINGS

FIG. 5 is a diagram showing an example of a CIP header used in the first embodiment;

FIG. 6 is a table showing an example of the relationship between the value in the FMT area and sorts of data in the first embodiment;

FIG. 9 is a table showing the relationship between the number of fractions, the number of data blocks per packet, and the rate and band of transmission of data in the first embodiment;

FIG. 12 is a table showing the relationship between the number of data blocks per packet and the rate and band of transmission of data in the second embodiment;

FIG. 14 is an example of a CIP header used in the third embodiment.

FIG. 15 is a table showing the relationship between the number of data blocks per packet and the rate and band of transmission of data in the third embodiment;

FIG. 19 is a table showing an example of a CIP header in MPEG2-PS transmission;

FIG. 23 is a diagram showing the format of a CIP header having an SYT area;

FIG. 24 is a table showing an example of the relationship between the value in the FMT area and sorts of data;

FIG. 25 is a table showing the format of the SYT area; and

FIG. 26 is a diagram showing the format of a CIP header having no SYT area.

DESCRIPTION OF THE PREFERRED EMBODIMENTS

Figure 1:
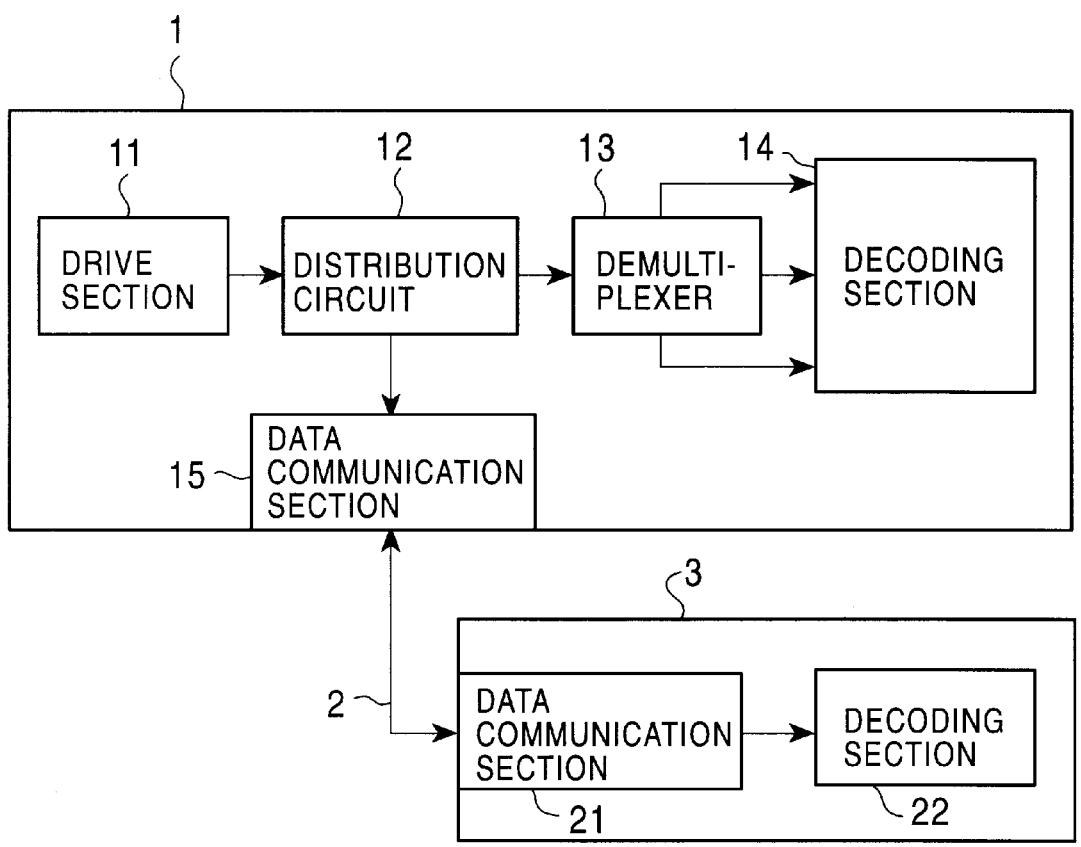
FIG. 1 is a block diagram showing the configuration of an example of an AV system for reproducing a DVD.

FIG. 1 shows the configuration of an example of an AV system for DVD playback. In a DVD player 1 of the AV system shown in FIG. 1, a drive section 11 is arranged to read out data (MPEG-PS data) recorded on a DVD (not shown) by using, for example, laser light and to output the read data to a distribution circuit 12.

The distribution circuit 12, supplied with MPEG-PS data from the drive unit 11, is arranged to output the MPEG-PS data to a demultiplexer 13 and to a data communication section 15.

The demultiplexer 13 is arranged to sort, out of supplied MPEG-PS data, a video pack having video information, an audio pack having audio information and a sub picture pack having information such as captions, and to output the packs to a decoding section 14.

The decoding section 14 incorporates decoders for decoding the video pack, the audio pack and the sub picture pack. Each decoder decodes the corresponding pack to form a video or audio signal and outputs the signal to a predetermined apparatus (not shown).

The data communication section 15 is arranged to convert packs of MPEG-PS data supplied from the distribution circuit 12 into packets for isochronous communication in accordance with the IEEE 1394 standard, and to transmit the packets to a digital television receiver (digital TV) 3 via an AV bus 2.

In the digital TV 3, a data communication section 21 is arranged to receive packets for isochronous communication in accordance with the IEEE 1394 standard transmitted from the DVD player 1 via the AV bus 2, to convert the packets into the original packs and to output the packs to a decoding section 22.

The decoding section 22 incorporates decoders for respectively decoding video, audio and sub picture packs, as does the decoding section 14 of the DVD player 1. The decoding section 22 sorts video, audio and sub picture packs out of supplied data, and each decoder decodes the corresponding pack to form a video or audio signal and outputs the signal to a predetermined circuit (not shown).

Figure 2:
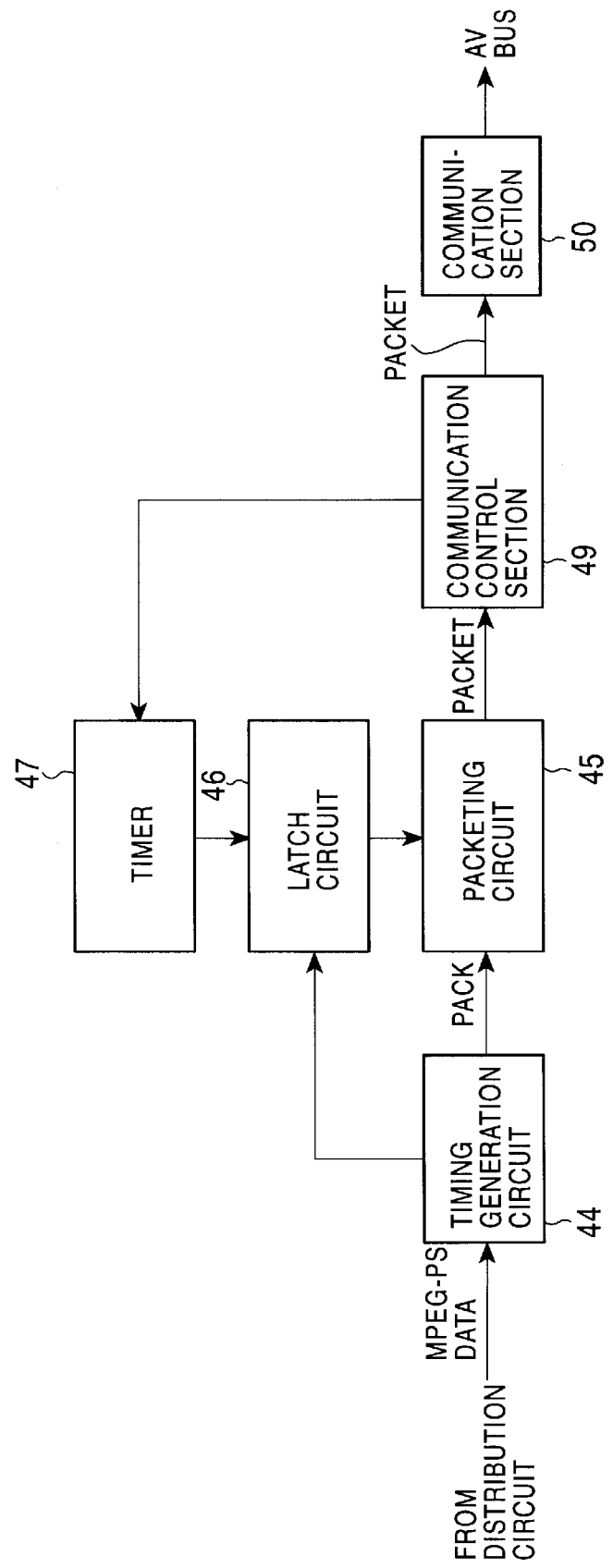
FIG. 2 is a block diagram showing the configuration of an example of a data communication section of a DVD player shown in FIG. 1, which represents a transmitting apparatus in accordance with a first embodiment of the present invention.

FIG. 2 shows the configuration of an example of the data communication section 15 of the DVD player 1, which represents a transmitting apparatus in accordance with a first embodiment of the present invention.

A timing generation circuit 44, which is supplied with MPEG-PS data from the distribution circuit 12, is arranged to output the MPEG-PS data directly to a packeting circuit 45 (conversion means) and to output a pulse signal to a latch circuit 46 when it outputs a pack of the MPEG-PS data to the packeting circuit 45.

A timer 47 is arranged to operate its internal counter for clocking and to output the value of the counter to the latch circuit 46. The timer 47 is also arranged to calibrate the value of the counter by a control signal supplied in a cycle of 125 μsec from a communication control section 49.

The latch circuit 46 is arranged to hold the value (time information) supplied from the timer 47 when a pulse signal is supplied from the timing generation circuit 44. The latch circuit 46 holds the value until the next pulse signal is supplied, and outputs the value to the packeting circuit 45.

The packeting circuit 45 is arranged to convert, in a procedure described below, a pack supplied from the timing generation circuit 44 and time information (a time stamp for suppressing jitter) supplied from the latch circuit 46 into packets for isochronous communication in accordance with IEEE 1394, and to output the packets to the communication control section 49.

This time stamp is used to suppress jitter (in transmission) and is not used for decoding of data.

The communication control section 49 is arranged to output, at the start of the period of a cycle of 125 μsec, a control signal to the timer 47 and a cycle sync signal and a cycle start packet to a communication section 50 (transmission means). One packet per cycle, supplied from the packeting circuit 45, is output from the communication control section 49 to the communication section 50.

The communication section 50 is arranged to transmit, over the AV bus 2, cycle sync signals, cycle start packets and isochronous communication packets supplied from the communication control section 49.

Figure 3:
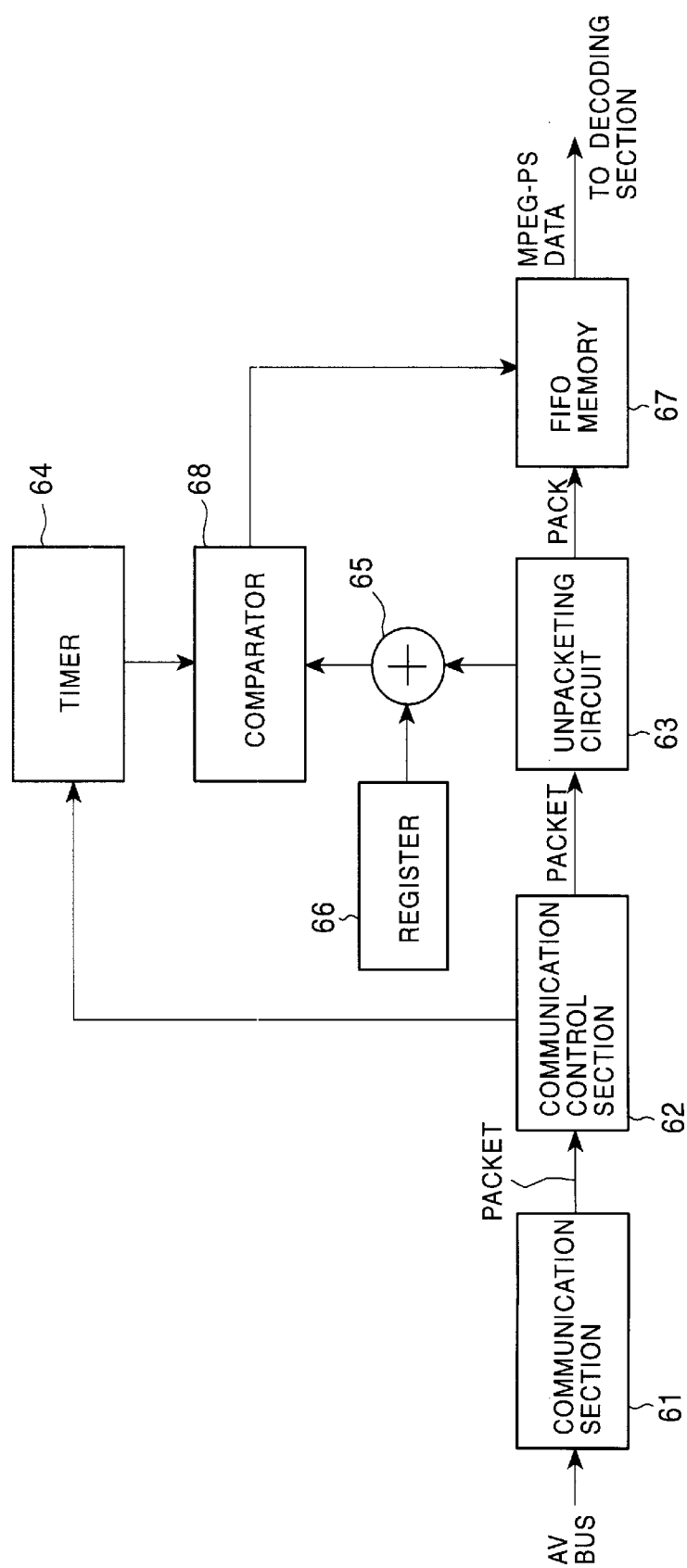
FIG. 3 is a block diagram showing the configuration of an example of a data communication section of a digital TV shown in FIG. 1, which represents a receiving apparatus in accordance with the first embodiment of the present invention.

FIG. 3 shows the configuration of an example of the data communication section 21 of the digital TV 3, which represents a receiving apparatus in accordance with the first embodiment of the present invention.

A communication section 61 (receiving means) is arranged to receive cycle sync signals, cycle start packets and isochronous communication packets transmitted via the AV bus 2, and outputs the signals and the packets to a communication control section 62.

The communication control section 62 is arranged to output a control signal according to a cycle sync signal to a timer 64 when supplied with the cycle sync signal, and to output a supplied isochronous communication packet to an unpacketing circuit 63 (restoration means).

The unpacketing circuit 63 is arranged to restore a pack of MPEG-PS data from a predetermined number of packets, as described below, and to output the restored pack to a FIFO memory 67. Also, the unpacketing circuit 63 is arranged to extract time information (time stamps) converted into packets together with the pack in the data communication section 15 of the DVD player 1, and to output the time information to an adder 65.

The adder 65 is arranged to calculate the sum of a delay time previously set in a register 65 and time information supplied from the unpacketing circuit 63, and to output the result of this calculation to a comparator 68.

The timer 64 is arranged to operate its internal counter for clocking and to output the value of the counter to the comparator 68. The timer 64 is also arranged to calibrate the value of the counter by a control signal supplied from the communication control section 62.

The comparator 68 is arranged to output a pulse signal to the FIFO memory 67 when a match occurs between the time clocked by the timer 64 and the time information supplied from the adder 65 (the time stamp of a pack+the delay time).

The FIFO memory 67 is arranged to output, to a decoding section 22, data (pack) supplied from the unpacketing circuit 63 when a pulse signal is supplied from the comparator 68. The FIFO memory 67 outputs the data in FIFO (first in first out) order, i.e., in order of input.

The operations of the above-described DVD player 1 (first embodiment) and digital TV 3 (first embodiment) will next be described.

First, the drive section 11 of the DVD player 1 reads out MPEG-PS data from a DVD, and outputs the data to the distribution circuit 12.

The distribution circuit 12 outputs the data to the demultiplexer 13 and to the timing generation circuit 44 of the data communication section 15.

The timing generation circuit 44 of the data communication section 15 outputs a pack of MPEG-PS data to the packeting circuit 45 and outputs a pulse signal to the latch circuit 46. The latch circuit 46 holds the time at which it receives the signal, and outputs the corresponding time information to the packeting circuit 45.

Figure 4:
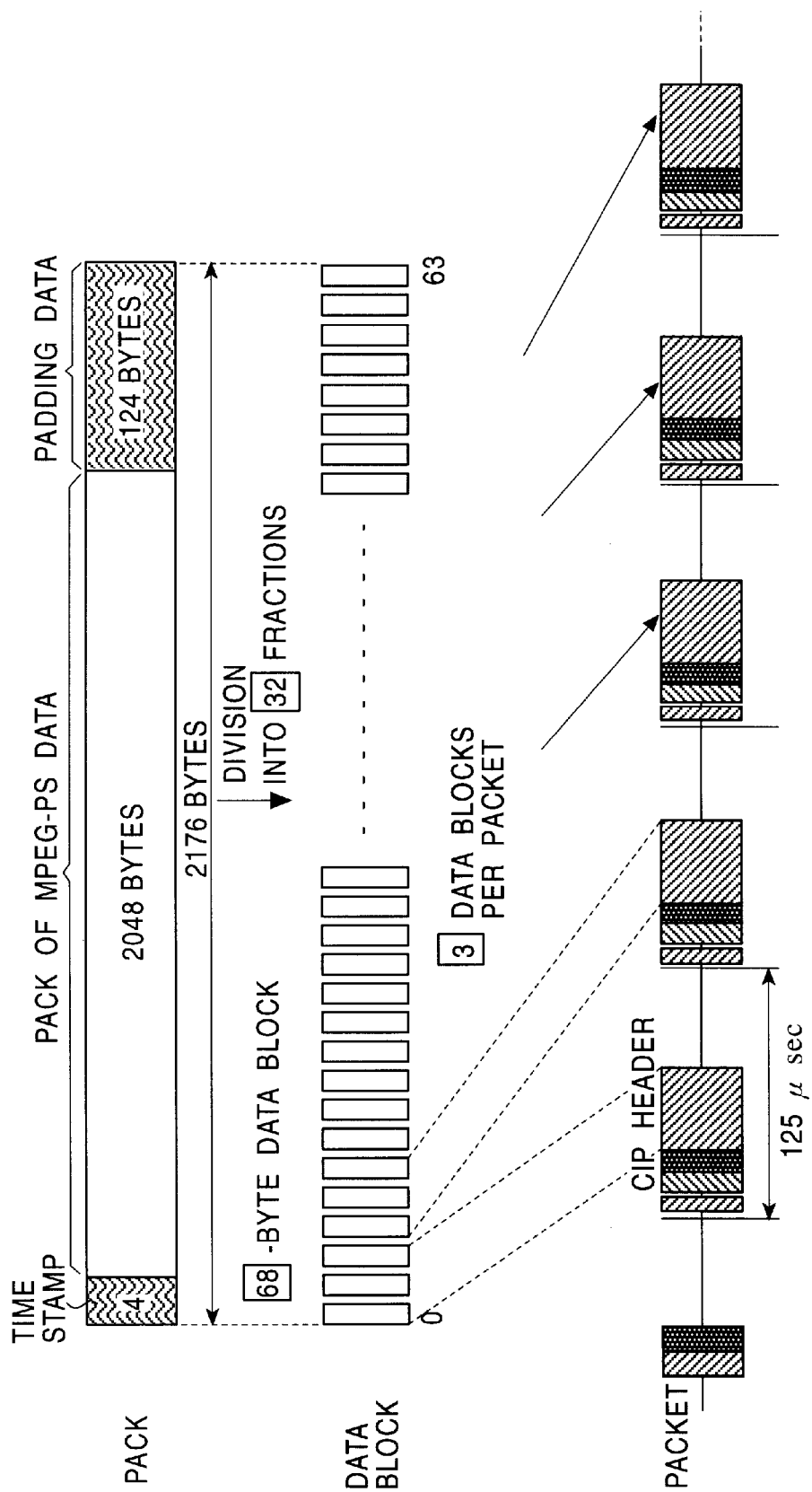
FIG. 4 is a diagram showing an example of a procedure for forming packets in the first embodiment.

Next, the packeting circuit 45 sets the supplied time information as a 4-byte time stamp and adds 124-byte padding data to the time stamp and the 2,048 byte pack in order that the total byte length be a multiple of 16, as shown in FIG. 4. As padding data, no particular information is held since padding data is added for the purpose of adjusting the total data length.

For example, a shown in FIG. 4, the packeting circuit 45 divides the time stamp, pack and padding data into a number of fractions which is a multiple of 2 (32 in this case) to convert them into the same number of data blocks having a byte length which is a multiple of 4 (64 bytes in this case). That is, data of a total length of 2176 (=4+2048+124) bytes is divided into 32 data blocks of 68 bytes.

Next, the packeting circuit 45 forms a CIP header and forms a packet containing the CIP header and a predetermined number of data blocks.

FIG. 5 shows an example of a CIP header format used in the first embodiment.

In this embodiment, the relationship between the value in the FMT area of the CIP header and sorts of data is set as shown in FIG. 6. That is, in the case of transmission of MPEG-PS data in this embodiment, the value in the FMT area is set to 100100 (binary), different from that for MPEG-TS.

Also in this CIP header, in the case of transmission of MPEG-PS data (i.e., in the case where the value in the FMT area is 100100 (binary)), the values in the original (FIG. 26) FN area and QPC area (the 17th to 21st bits of the No. 0 quadlet) are fixed at 0. Also, the three, 2nd to 4th bits in the FDF area (shown as new FN) are used as a new FN area while the eight, 5th to 12th bits in the FDF area (shown as new QPC) are used as a new QPC area.

The value in the FN area (new FN) is set to the logarithm of the number of fractions FN to base 2 ($\log_2 FN$).

Thus, a pack can be converted into a packet by increasing the number of bits assigned to the FN and QPC areas even if the number of fractions is large or the length of padding data is long as in the case of processing a pack of MPEG-PS data.

In the CIP header shown in FIG. 5, the value in the DBS area is 00010001 (binary), the value in the FN area (new FN) is 101 (binary) and the value in the QPC area (new QPC) is 00011111 (binary). Therefore, the length of each data block is 17 quadlets, i.e., 68 bytes, the number of fractions into which a pack is divided is 32 (=$2^5$), and the length of padding data is 31 quadlets, i.e., 124 bytes.

Figure 7:
FIG. 7 is a diagram showing another example of the CIP header used in the first embodiment.

A CIP header such as shown in FIG. 7 may also be formed to use both the original FN area and the new FN area (shown as sub FN). In such a case, if the value in the original FN area is $n_{FN1}$ and the value in the new FN area (sub FN) is $n_{FN2}$, the number of fractions is the ($n_{FN1}$+is $n_{FN2}$)th power of 2.

Figure 8:
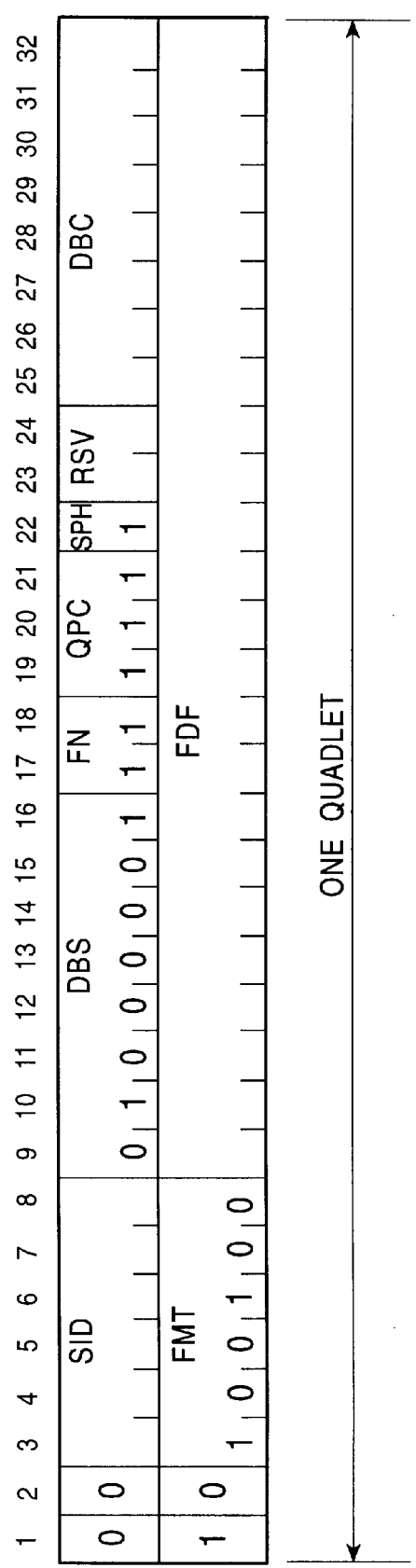
FIG. 8 is a diagram showing a further example of the CIP header used in the first embodiment.
Figure 26:
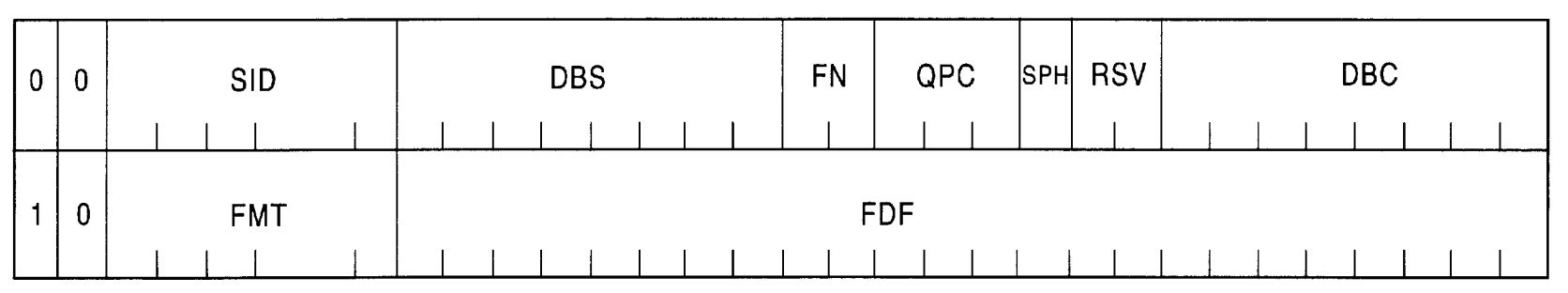

Further, as shown in FIG. 8, the same formal as that of the CIP header shown in FIG. 26 may be used. In such a case, however, the number of fractions is limited to 8 (=$2^3$) or less and the length of padding data is limited to 7 quadlets or less. Therefore, the data transmission rate is 16.4 Mbps (16.4×$10^6$ bits/sec) or higher.

FIG. 9 shows the rate and band of transmission of DVD data (i.e., MPEG-PS data) in the case where the number of fractions is one of 8, 16, 32, and 64 and where the number of data blocks per packet is one of 1 to 8, 16, 32, and 64. If the number of data blocks per packet is a power of 2, processing in the packeting circuit 45 is simplified.

If the number of fractions is FN and if the number of data blocks per packet is DB, the amount of MPEG-PS data (average) contained in one packet is (2048/FN)×DB bytes (=16384/FN)×DB bits), and packets are distributed each in a cycle of 125 μsec. As a result, the rate of transmission of MPEG-PS data is (131.1/FN)×DB (={2048×8/125}/FN}×DB) Mbps.

Since the DVD playback rate in accordance with the standard is 2.52 Mbps, 5.04 Mbps, or 10.08 Mbps, the number of fractions FN and the number of data blocks DB per packet are set so as to satisfy one of the following equations:

$$(131.1/FN) \times DB \geq 10.08$$

$$(131.1/FN) \times DB \geq 5.04$$

$$(131.1/FN) \times DB \geq 2.52$$

That is, if the playback rate is changed, FN and DB are changed in accordance with the above equations.

Accordingly, in the case where the playback rate is set to 10.08 Mbps and where division into 64 fractions is made, the number of data blocks per packet is set to 5 or greater. If division into 32 fractions is made, the number of data blocks per packet is set to 3 or greater. If division into 16 fractions is made, the number of data blocks per packet is set to 2 or greater.

That is, in forming one packet, the packeting circuit 45 uses data blocks corresponding to the number of data blocks set as described above.

The band of communication in accordance with the IEEE 1394 standard is calculated as shown by the following equation:

$$Band = Overhead\_ID \times C + (Payload + K) \times DR$$

Overhead_ID is 15 (default value), C is fixed at 32 units and K is fixed at 3. Also, Payload is the number of quadlets of transmitted data (data blocks and CIP headers), and DR is a value which is set according to a performance of communication. In the case of 100 M transmission, DR is set to 16. In the case of 200 M transmission, DR is set to 8. In the case of 400 M transmission, DR is set to 4. In FIG. 9, the band is calculated by setting DR to 16.

For example, referring to FIG. 9, if the number of fractions is 64 and if the number of data blocks per packet is 1, the band used is 704 (=15×32+(11+3)×16) units.

Packets formed in the above-described manner are supplied to the communication control section 49.

The communication control section 49 outputs a control signal to the timer 47 in every 125 μsec cycle at the start of the cycle, simultaneously outputs a cycle sync signal and a cycle start packet to the communication section 50. Also, the communication control section 49 is supplied with packets from the packeting circuit 45 and outputs the packets to the communication section 50 one in every cycle.

The communication section 50 transmits, over the AV bus 2, cycle sync signals, start packets and isochronous communication packets supplied from the communication control section 49.

In the above-described manner, MPEG-PS data is converted into packets for isochronous communication and the packets are transmitted over the AV bus 2.

The communication section 61 of the digital TV 3 receives cycle sync signals, cycle start packets and isochronous communication packets transmitted from the DVD player 1 via the AV bus 2, and outputs the received signals and packets to the communication control section 62.

When supplied with one cycle sync signal, the communication control section 62 outputs a control signal according to the cycle sync signal to the timer 64, and outputs the corresponding supplied isochronous communication packet to the unpacketing circuit 63.

The unpacketing circuit 63 reads the CIP header of each supplied isochronous communication packet and restores the group of data formed of MPEG-PS data, a time stamp and padding data from at least one packet corresponding to FN data blocks.

The unpacketing circuit 63 removes, from the restored data, the padding data of the byte length corresponding to the value in the QPC area of the CIP header by referring to the value in the QPC area, outputs the head 4-byte time stamp to the adder 65, and outputs the pack of NPEG-PS data to the FIFO memory 67.

The adder 65 calculates the sum of the preset delay time supplied from the register 65 and time information (time stamp) supplied from the unpacketing circuit 63, and outputs the result of this calculation to the comparator 68.

The comparator 68 outputs a pulse signal to the FIFO memory 67 when a match occurs between the time (clocked by the timer 64 and the time information supplied from the adder 65 (the time stamp of the pack+the delay time).

When supplied with the pulse signal from the comparator 68, the FIFO memory 67 outputs, to the decoding section 22, the data supplied from the unpacketing circuit 63. The FIFO memory 67 outputs the data in FIFO order, i.e., in order of input. Thus, the data is supplied to the decoding section 22 in synchronization with the time stamp, thereby suppressing jitter.

The decoding section 22 decodes the MPEG-PS data to form video and audio signals, and outputs the signals to predetermined circuits (not shown).

In the first embodiment, as described above, a group of data formed by adding a time stamp and padding data to an MPEG-PS data pack of 2,048 bytes is divided to form data blocks, and packets having a predetermined number of the data blocks are transmitted, thus transmitting the pack of 2,048 bytes to the digital TV 3 operating as a decoder through the digital interface in accordance with the IEEE 1394 standard.

A DVD player 1 which represents a transmitting apparatus in accordance with a second embodiment of the present invention and a digital TV 3 which represents a receiving apparatus in accordance with the second embodiment of the present invention will next be described.

The DVD player 1 of the second embodiment has the same configuration as the DVD player 1 of the first embodiment and differs from the first DVD player 1 only in the operation of the packeting circuit 45. Therefore, the configuration of the DVD player 1 of the second embodiment will not be described.

The digital TV 3 of the second embodiment has the same configuration as the digital TV 3 of the first embodiment and differs from the first digital TV 3 only in the operation of the unpacketing circuit 63. Therefore, the configuration of the digital TV 3 of the second embodiment will not be described.

The operations of the second embodiment DVD player 1 and digital TV 3 will now be described. The following description refers only to the operations of the packeting circuit 45 and the unpacketing circuit 63 because the operations of the sections other than the packeting circuit 45 and the unpacketing circuit 63 are the same as those in the first embodiments.

Figure 10:
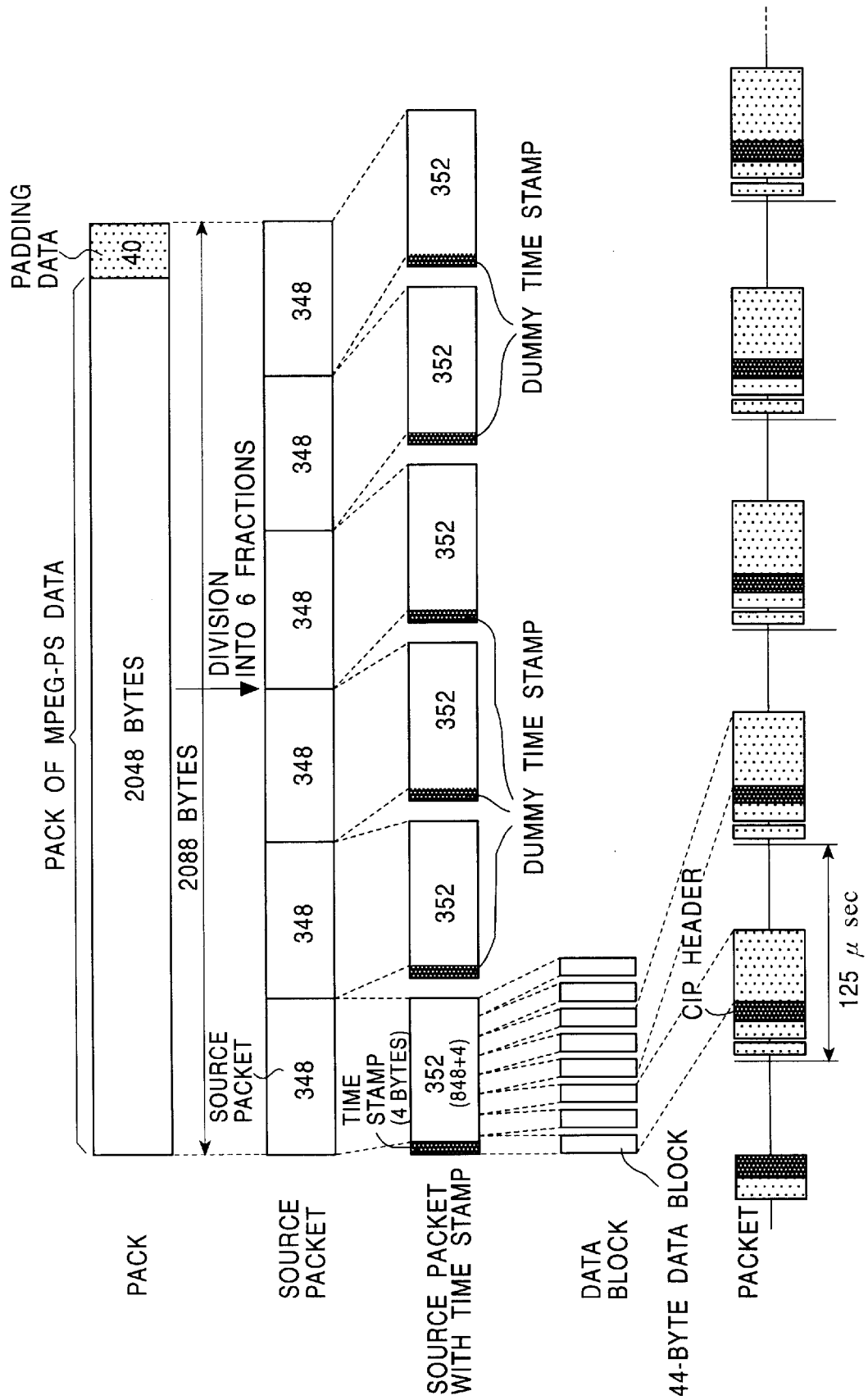
FIG. 10 is a diagram showing an example of a procedure for forming packets in a second embodiment of the present invention.

The packeting circuit 45 of the second embodiment first adds padding data to a pack of 2,048 bytes, as shown in FIG. 10. The length of padding data is set to such a value that the byte length of one source packet formed by dividing the data formed of the pack of 2,048 bytes and paddling data into a first number of fractions $FN_1$ is equal to a value obtained by subtracting the byte length of a time stamp (=4) from a multiple of 16.

That is, if the byte length of the time stamp is $L_{TS}$ ($L_{TS}$ =4), the byte length $L_{PD}$ of padding data is calculated as shown by the following equation using a predetermined positive integer n:

$$L_{PD}=FN_1 \times (16 \times n - L_{TS})-2048$$

The number n is assumed to be an integer equal to or greater than $(2048/FN_1+L_{TS})/16$.

For example, if $L_{TS}=4$ and $FN_1=6$ as shown in FIG. 10, and if n is set to 22, the byte length $L_{PD}$ of padding data calculated is 40 (=6×(16×22−4)−2048).

Next, the packeting circuit 45 divides the data formed of the length of padding data calculated as described above, and the pack of 2,048 bytes into the first number of fractions $FN_1$, thereby forming $FN_1$ source packets having a byte length of a multiple of 16. If the byte length of each source packet is $L_{SP}$, it is calculated as shown by the following equation:

$$L_{SP}=(2048+L_{PD})/FN_1$$

For example, if the length of padding data is 40 bytes and the first number of fractions $FN_1$ is 6, the length of each source packet is 348 (=(2048+40)/6) bytes, as shown in FIG. 10.

Then, as shown in FIG. 10, the packeting circuit 45 adds the 4-byte time stamp to the headmost end of each formed source packet, divides each source packet with the added 4-byte time stamp into a second number of fractions $FN_2$ which is a multiple of 2 ($FN_2=8$ in this case), thereby forming data blocks having a byte length of a multiple of 4 (44 bytes in this case).

The packeting circuit 45 then forms a CIP header and forms a packet containing the CIP header and a predetermined number of the data blocks.

Figure 11:
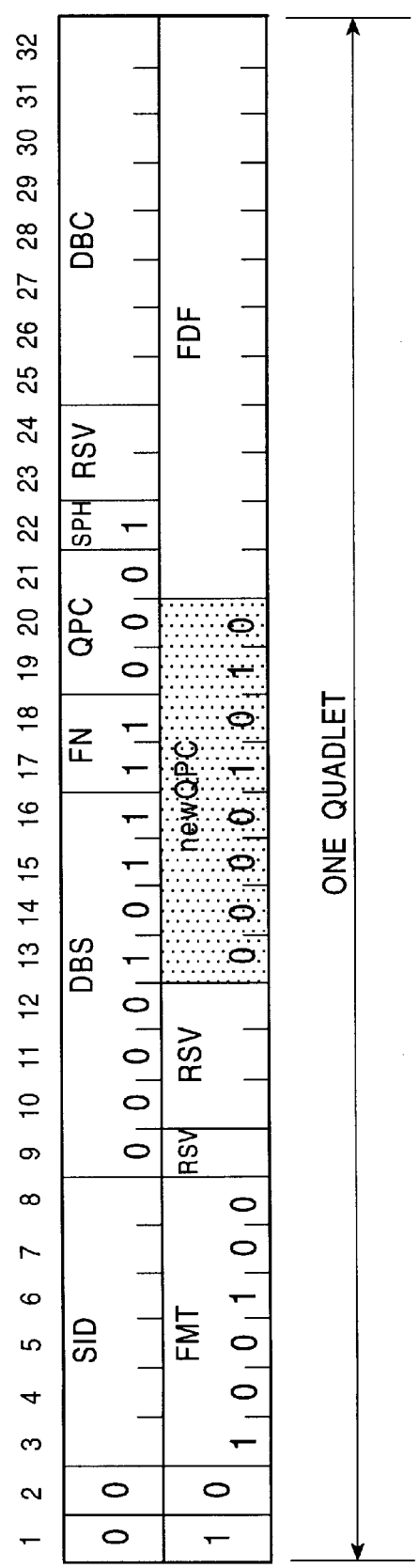
FIG. 11 is an example of a CIP header used in the second embodiment.

FIG. 11 shows an example of a CIP header format used in the second embodiment.

The relationship between the value in the FMT area of the CIP header and sorts of data set in this embodiment is the same as that in the first embodiment.

In this CIP header, if MPEG-PS data is transmitted (that is, if the value in the FMT area is 100100 (binary)), the logarithm of the second number of fractions $FN_2$ to base 2 ($\log_2(FN_2)$) is written in the FN area, and the value in the original (FIG. 26) QPC area (the 19th to 21st bits of the No. 0 quadlet) is fixed at 0. The eight, 5th to 12th bits in the FDF area (shown as new QPC) are used as a new QPC area.

Since the first number of fractions $FN_1$ is fixed as a preset number, it is not transmitted through packets. Only the second number of fractions $FN_2$ is written in the header while the first number of fractions $FN_1$ is fixed. Therefore, only two bits in the FN area may suffice.

Thus, the number of bits assigned to the QPC area is increased to enable conversion of a pack into packets even if the length of padding data is large.

In the CIP header shown in FIG. 11, the value in the DBS area is 00001011 (binary), the value in the FN area is 11 (binary) and the value in the QPC area (new QPC) is 00001010 (binary). Therefore, the length of the data block is 11 quadlets, i.e., 44 bytes, the second number of fractions is 8 (=$2^3$), and the length of padding data is 10 quadlets, i.e., 40 bytes.

FIG. 12 shows the rate and band of transmission of DVD data (i.e., MPEG-PS data) in the case where the first number of fractions $FN_1$ is 6, the second number of fractions $FN_2$ is 8, and the number of data blocks per packet is one of 1 to 8, 16, 32, and 64.

If the number of data blocks per packet is DB, the amount of MPEG-PS data (average) contained in one packet is $(2048/(FN_1 \times FN_2)) \times DB$ bytes $(=(16384/(FN_1 \times FN_2)) \times DB$ bits), and packets are distributed each in a cycle of 125 μsec. As a result, the rate of transmission of MPEG-PS data is $(131.1/(FN_1 \times FN_2)) \times DB$ (Mbps).

Since the DVD playback rate is 2.52 Mbps, 5.04 Mbps, or 10.08 Mbps, the numbers of fractions $FN_1$ and $FN_2$ and the number of data blocks DB per packet are set so as to satisfy one of the following equations:

$$(131.1/(FN_1 \times FN_2)) \times DB \geq 10.08$$

$$(131.1/(FN_1 \times FN_2)) \times DB \geq 5.04$$

$$(131.1/(FN_1 \times FN_2)) \times DB \geq 2.52$$

That is, if the playback rate is changed, FN and DB are changed in accordance with the above equations.

Accordingly, in the case where the playback rate is set to 10.08 Mbps and where the first and second numbers of fractions are 6 and 8, respectively, the number of data blocks per packet is set to 4 or greater. Also in the case where the first or second number of fractions is set to some other value, the number of data blocks per packet is set to a number calculated in the same manner.

In the above-described manner, the packeting circuit 45 of the second embodiment converts an MPEG-PS data pack of 2,048 bytes into isochronous communication packets.

The operation of the unpacketing circuit 63 of the second embodiment will next be described.

The unpacketing circuit 63 reads the CIP header of each of packets supplied from the communication control section 62 and restores source packets with added time stamps each from at least one packet corresponding to $FN_2$ data blocks.

Next, the unpacketing circuit 63 outputs the head 4-byte time stamps to the adder 65, and restores one pack of MPEG-PS data with added padding data from $FN_1$ source packets.

Then, the unpacketing circuit 63 removes, from the restored data, the padding data of the byte length corresponding to the values in the QPC areas of the CIP headers by referring to the values in the QPC areas, and outputs the pack of MPEG-PS data to the FIFO memory 67.

Thus, the unpacketing circuit 63 of the second embodiment restores the MPEG-PS data pack of 2,048 bytes from isochronous communication packets.

In the second embodiment, as described above, a group of data formed by adding padding data to one MPEG-PS data pack of 2,048 bytes is divided to form source packets, groups of data formed by adding time stamps to the source packets are further divided to form data blocks, and packets each having a predetermined number of data blocks are transmitted, thus transmitting the pack of 2,048 bytes to the digital TV 3 operating as a decoder through the digital interface in accordance with the IEEE 1394 standard.

A DVD player 1 which represents a transmitting apparatus in accordance with a third embodiment of the present invention and a digital TV 3 which represents a receiving apparatus in accordance with a third embodiment of the present invention will next be described.

The DVD player 1 of the third embodiment has the same configuration as the DVD player 1 of the first embodiment and differs from the first DVD player 1 only in the operation of the packeting circuit 45. Therefore, the configuration of the DVD player 1 of the third embodiment will not be described.

The digital TV 3 of the third embodiment has the same configuration as the digital TV 3 of the first embodiment and differs from the first digital TV 3 only in the operation of the unpacketing circuit 63. Therefore, the configuration of the digital TV 3 of the third embodiment will not be described.

The operations of the third embodiment DVD player 1 and digital TV 3 will now be described. The following description refers only to the operations of the packeting circuit 45 and the unpacketing circuit 63 because the operations of the sections other than the packeting circuit 45 and the unpacketing circuit 63 are the same as those in the first embodiments.

The packeting circuit 45 in the third embodiment divides a pack of 2,048 bytes into a predetermined number of fractions which is a multiple of 2, thereby forming FN data blocks having a byte length of a multiple of 4.

Figure 13:
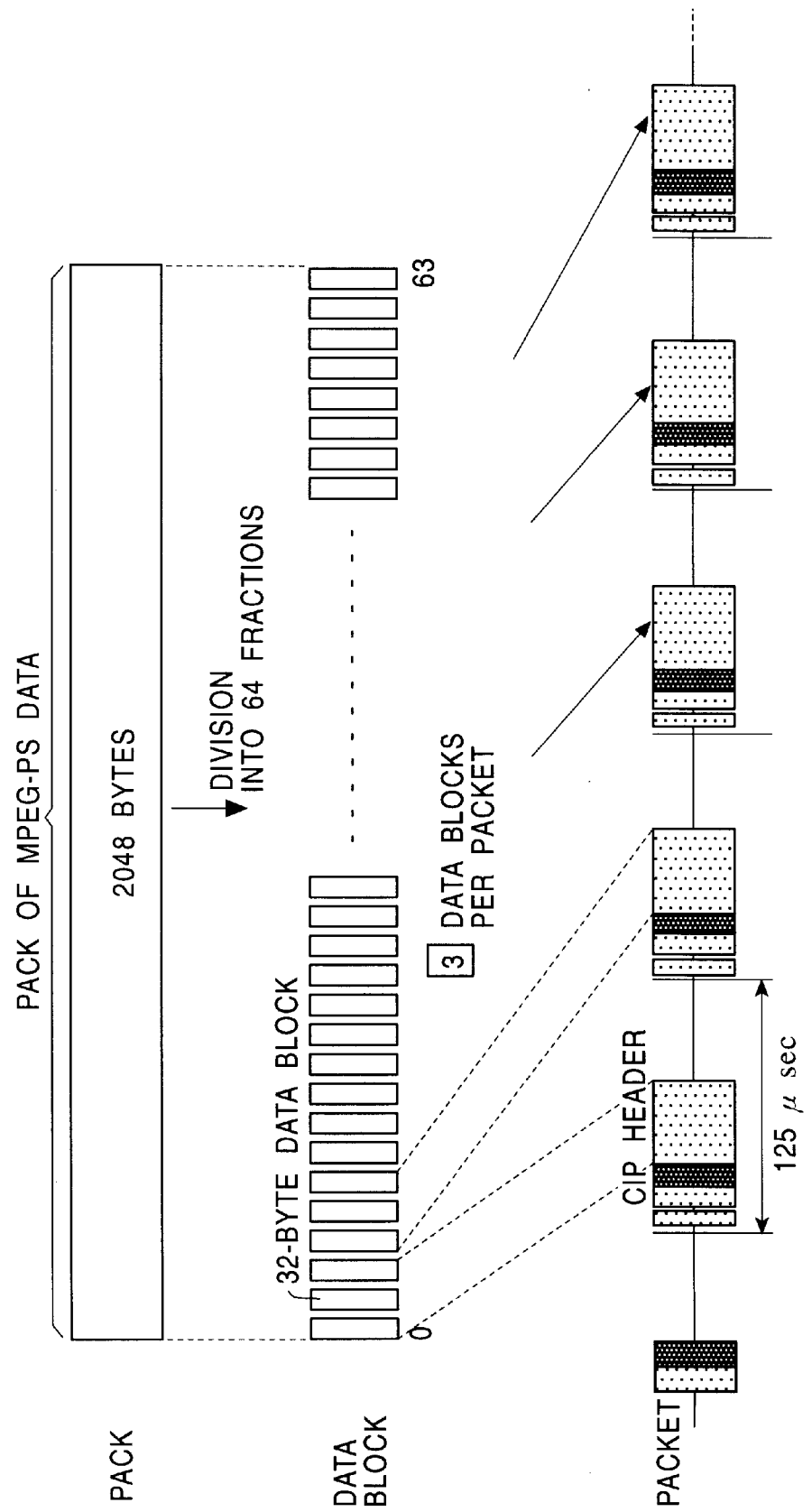
FIG. 13 is a diagram showing an example of a procedure for forming packets in a third embodiment of the present invention.

For example, if a pack of 2,048 bytes is divided into 64 fractions, 64 data blocks each consisting of 32 (=2,048/64) bytes are formed, as shown in FIG. 13.

The packeting circuit 45 forms a CIP header and forms a packet containing the CIP header and a predetermined number of the data blocks.

FIG. 14 shows an example of a CIP header format used in the third embodiment.

The relationship between the value in the FMT area of the CIP header and sorts of data set in this embodiment is the same as that in the first embodiment.

In this CIP header, if MPEG-PS data is transmitted (that is, if the value in the FMT area is 100100 (binary)), the value in the original (FIG. 26) QPC area (the 17th and 18th bits of the No. 0 quadlet) is fixed at 0, and the three, 2nd to 4th bits in the FDF area (shown as new FN) are used as a new FN area.

In this embodiment, the value in the QPC area is set to 0 since no padding data is used. In this embodiment, a CIP header having an SYT area is used and a time stamp of a pack is set in the SYT area.

Thus, the number of bits assigned to the FM area is increased to enable a pack to be converted into packets even if the number of fractions is large.

In the CIP header shown in FIG. 14, the value in the DBS area is 00001000 (binary), the value in the new FN area (new FN) is 110 (binary), the length of the data block is set to 8 quadlets, i.e., 32 bytes, and the number of fractions is set to 64 (=$2^6$).

FIG. 15 shows the rate and band of transmission of DVD data (i.e., MPEG-PS data) in the case where the number of fractions is 64 and the number of data blocks per packet is one of 1 to 8.

If the number of fractions is FN and if the number of data blocks per packet is DB, the amount of MPEG-PS data contained in one packet is $(2048/FN) \times DB$ bytes (=16384/$FN) \times DB$ bits), and packets are distributed each in a cycle of 125 μsec. As a result, the rate of transmission of MPEG-PS data is calculated as $(131.1/FN) \times DB$ (Mbps).

Since the DVD playback rate is 2.52 Mbps, 5.04 Mbps, or 10.08 Mbps, the number of fractions FN and the number of data blocks DB per packet are set so as to satisfy one of the following equations:

$$(131.1/FN) \times DB \geq 10.08$$

$$(131.1/FN) \times DB \geq 5.04$$

$$(131.1/FN) \times DB \geq 2.52$$

That is, if the playback rate is changed, FN and DB are changed in accordance with the above equations.

Accordingly, in the case where the playback rate is set to 10.08 Mbps and where the number of fractions is 64, the number of data blocks per packet is set to 5 or greater. Also in the case where the number of fractions is set to some other value, the number of data blocks per packet is set to a number calculated in the same manner.

In the above-described manner, the packeting circuit 45 of the third embodiment converts an MPEG-PS data pack of 2,048 bytes into isochronous communication packets.

The operation of the unpacketing circuit 63 of the third embodiment will next be described.

The unpacketing circuit 63 reads the CIP header of each of packets supplied from the communication control section 62 and restores one pack from at least one packet corresponding to FN data blocks. Also, the unpacketing circuit 63 reads out a time stamp from the SYT area of the CIP header and outputs the read value to the adder 65.

The unpacketing circuit 63 outputs the restored pack of MPEG-PC data to the FIFO memory 67.

Thus, the unpacketing circuit 63 of the third embodiment restores the MPEG-PS data pack of 2,048 bytes from isochronous communication packets.

In the third embodiment, as described above, an MPEG-PS data pack of 2,048 bytes is divided to form data blocks, and packets each having a predetermined number of delta blocks are transmitted, thus transmitting the pack of 2,048 bytes to the digital TV 3 operating as a decoder through the digital interface in accordance with the IEEE 1394 standard.

A DVD player 1 which represents a transmitting apparatus in accordance with a fourth embodiment of the present invention and a digital TV 3 which represents a receiving apparatus in accordance with the fourth embodiment of the present invention will next be described.

The DVD player 1 of the fourth embodiment has the same configuration as the DVD player 1 of the first embodiment and differs from the first DVD player 1 only in the operation of the packeting circuit 45. Therefore, the configuration of the DVD player 1 of the fourth embodiment will not be described.

The digital TV 3 of the fourth embodiment has the same configuration as the digital TV 3 of the first embodiment and differs from the first digital TV 3 only in the operation of the unpacketing circuit 63. Therefore, the configuration of the digital TV 3 of the fourth embodiment will not be described.

The operations of the fourth embodiment DVD player 1 and digital TV 3 will now be described. The following description refers only to the operations of the packeting circuit 45 and the unpacketing circuit 63 because the operations of the sections other than the packeting circuit 45 and the unpacketing circuit 63 are the same as those in the first embodiments.

The operation of the packeting circuit 45 will first be described with reference to the flowchart of FIG. 17. In step S1, the packeting circuit 45 in the fourth embodiment previously divides an MPEG2-PS data pack of 2,048 bytes shown in FIG. 16(A) into the first number of fractions $FN_1$ (=8), thereby forming, as shown in FIG. 16(B), eight groups of data each consisting of 256 bytes as source packets to be transmitted in isochronous communication in accordance with IEEE 1394.

Next, in step S2, a 4-byte source packet header is added to the headmost end of each source packet formed in step S1. That is, a time stamp is added in order to reduce jitter at the time of transmission. The process then advances to step S3 to add 28-byte padding data to the hindmost end of each source packet in order to form data blocks of the quadlet unit size, as described below. In this manner, a 288-byte source packet is formed, as shown in if FIG. 16(C).

Figure 16:
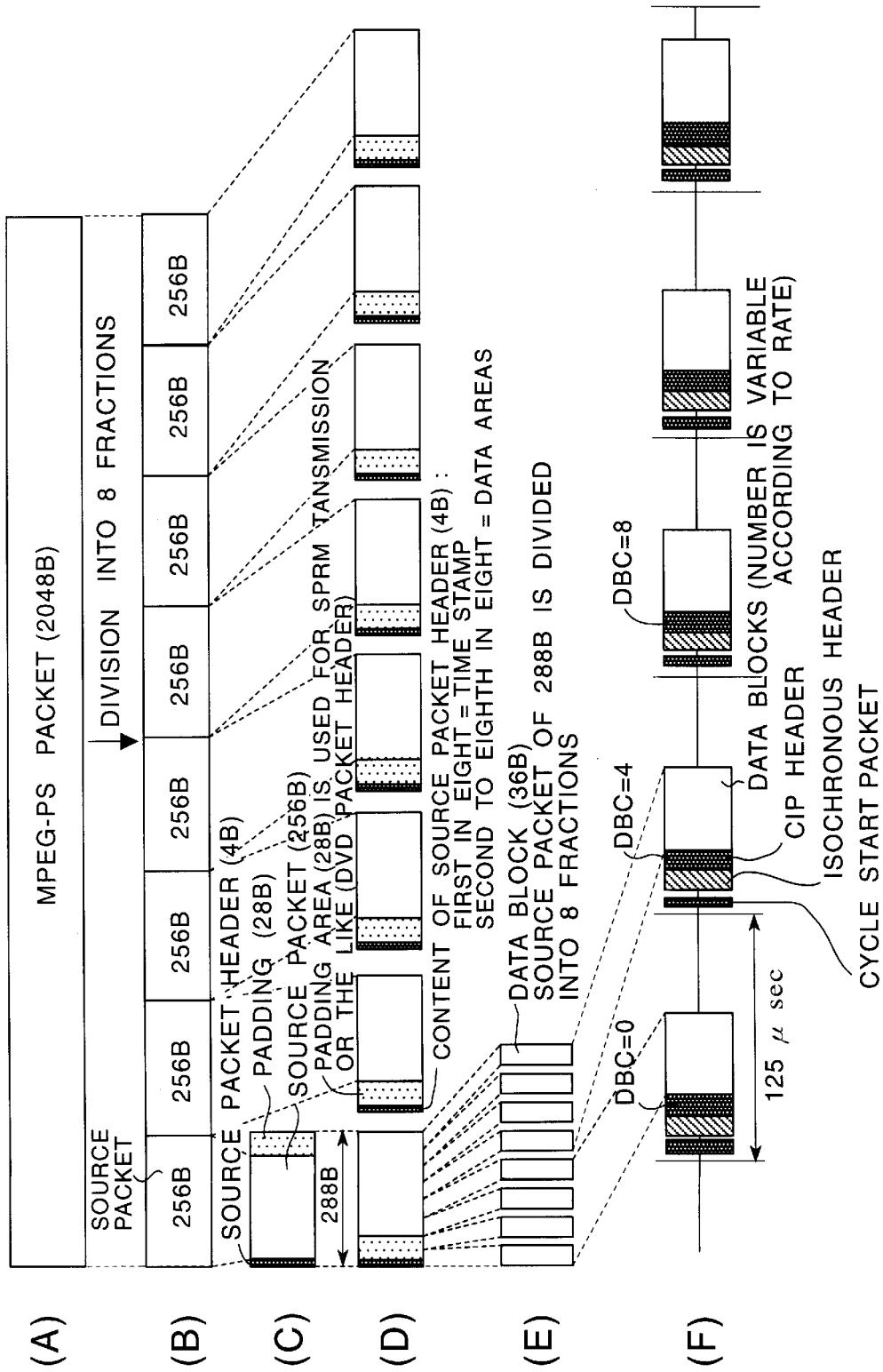
FIG. 16 is a diagram showing an example of a procedure for forming packets in a fourth embodiment of the present invention.
Figure 17:
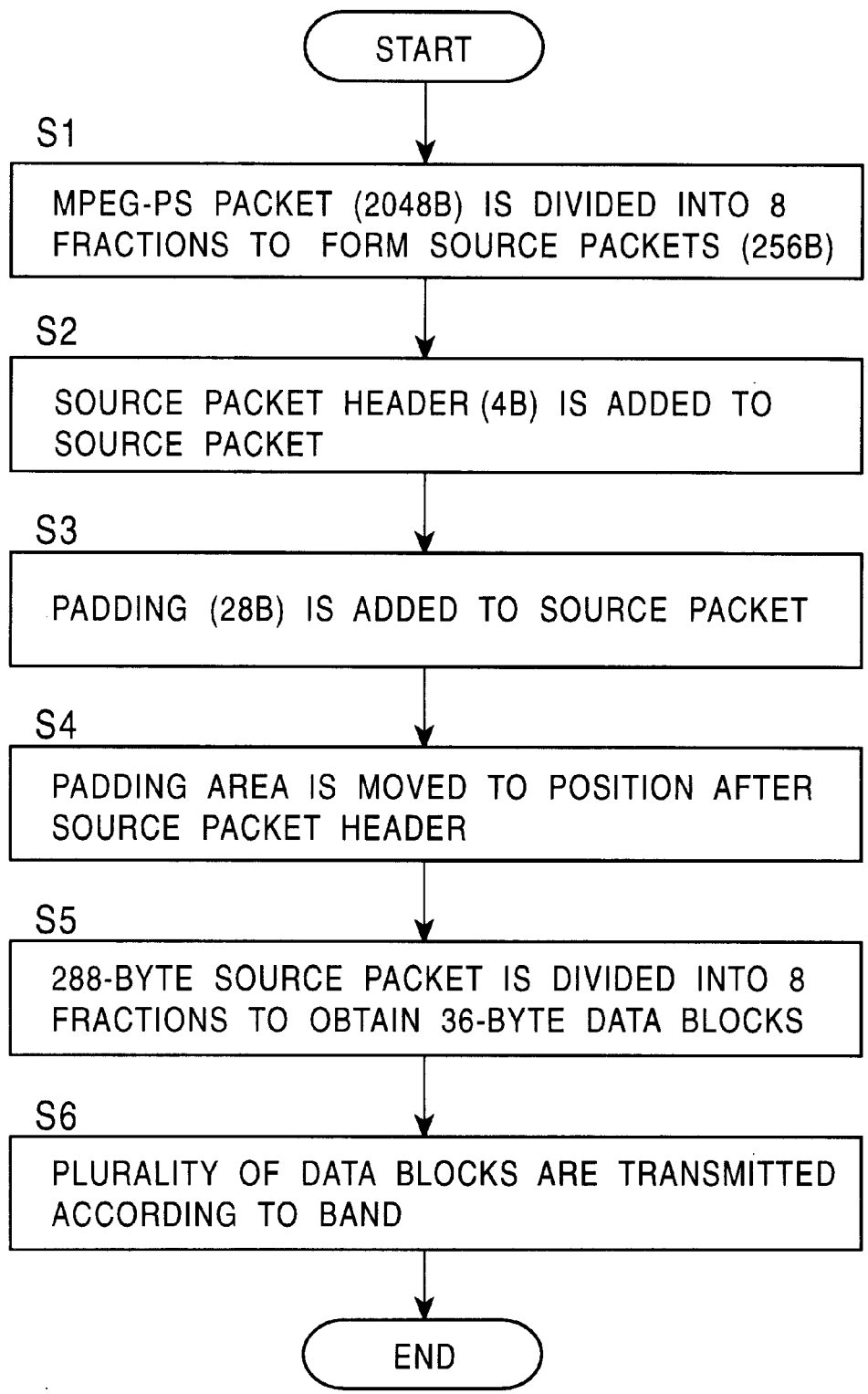
FIG. 17 is a flowchart for explaining the procedure for forming packets in the fourth embodiment.

In step S4, the area in which padding data is added in step S3 is moved to the position immediately after the source packet header to be used for transmission of a system parameter (SPRM) or the like, as shown in FIG. 16(D). This is because processing of the data is easier if the data area is closer to the headmost end.

In the source packet headers added to the source packets, each of those added to the second and other subsequent source packet headers in the eight source packet headers may be used as a data area. No information is written if they are not used as data areas.

In step S5, each 288-byte source packet is divided into the second number of fractions $FN_2$ (8 in this case), thereby obtaining 36-byte data blocks, as shown in FIG. 16(E).

The process then advances to step S6 and the packeting circuit 45 forms a CIP header and forms a packet containing the CIP header and a predetermined number of data blocks.

Figure 18:
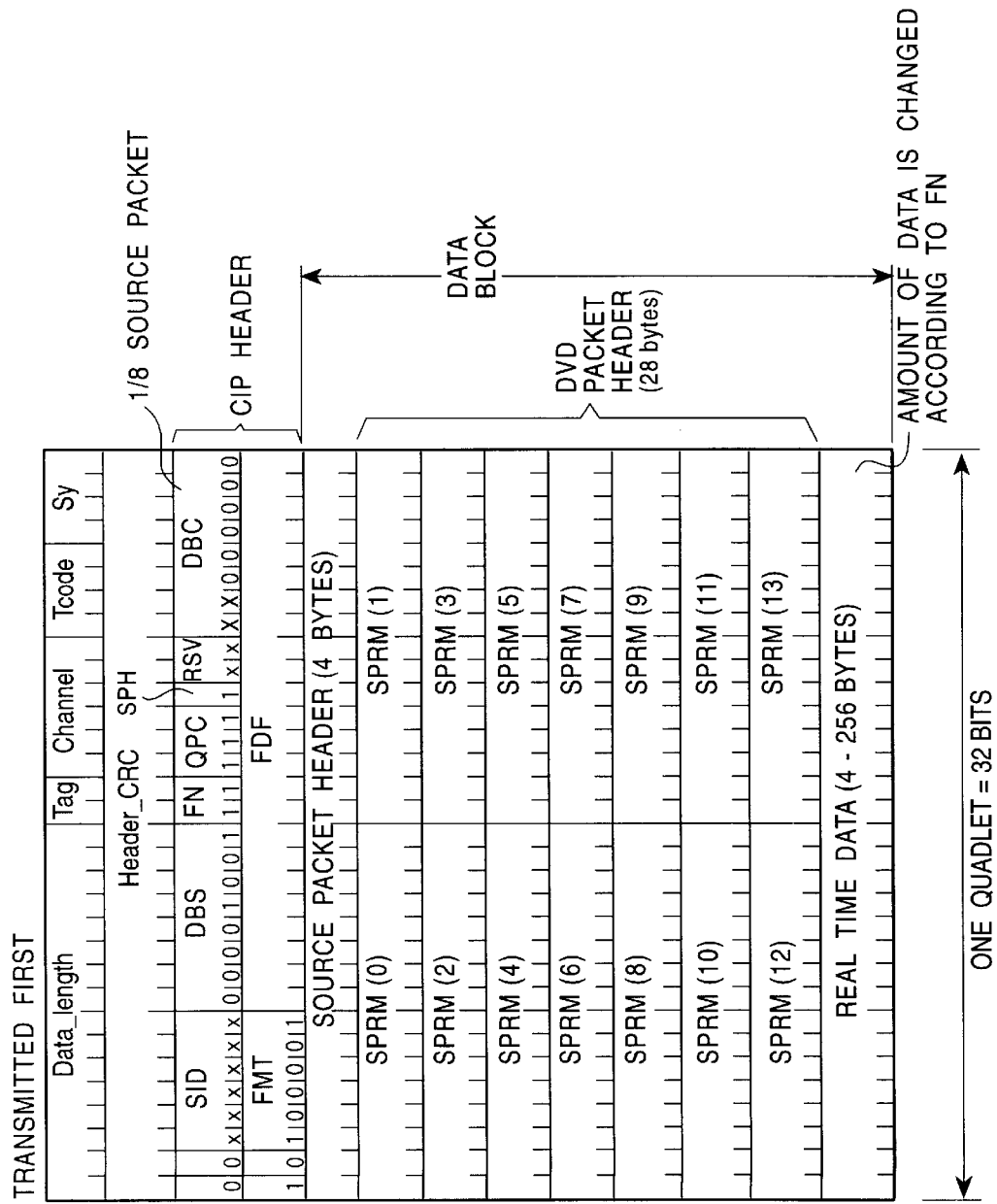
FIG. 18 is a diagram showing a format of transmitted data.
Figure 20:
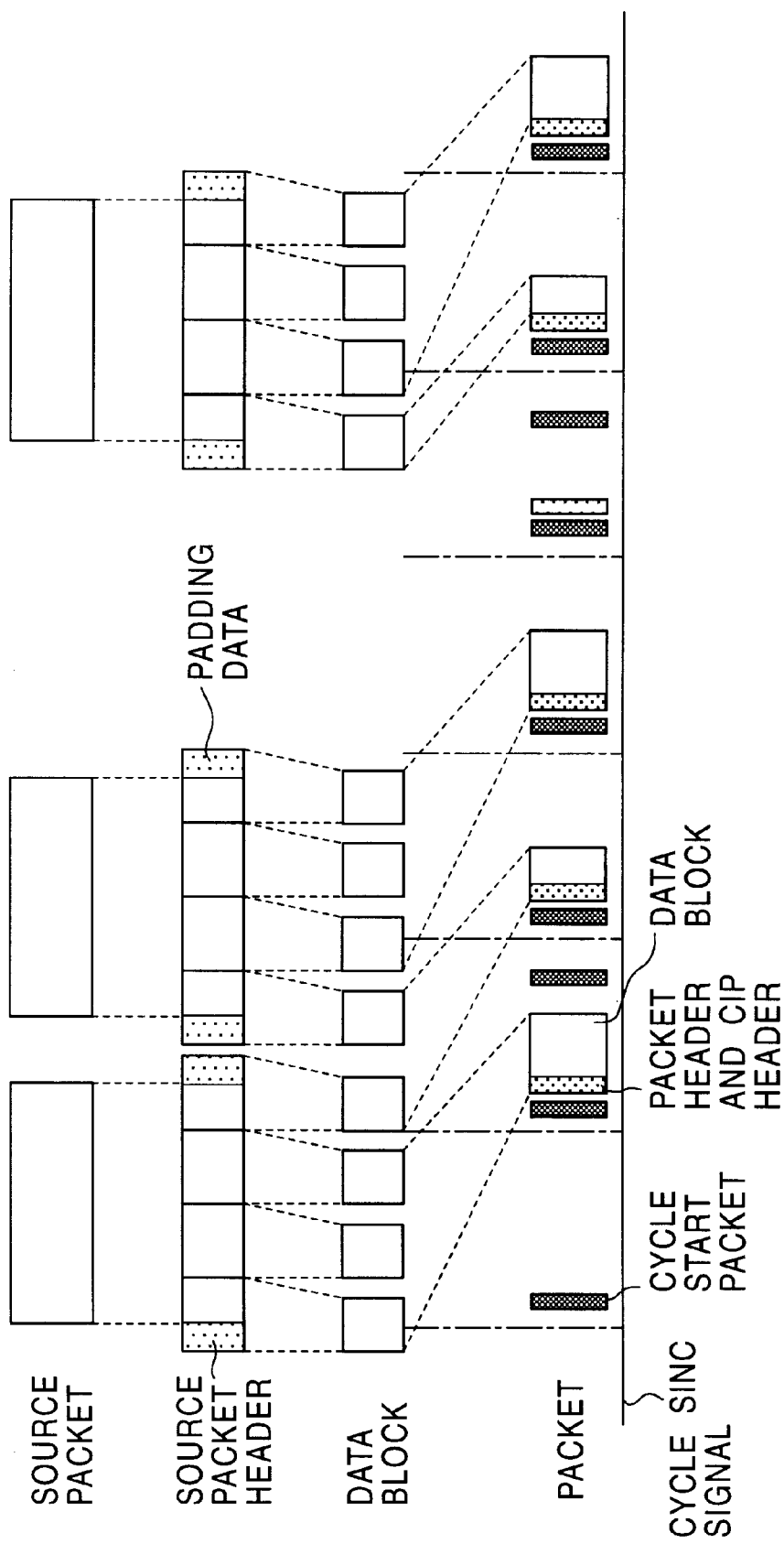
FIG. 20 is a diagram showing an example of the relationship between original data and transmitted packets.
Figure 21:
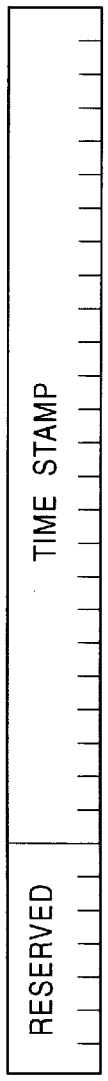
FIG. 21 is a diagram showing the format of a source packet header.
Figure 22:
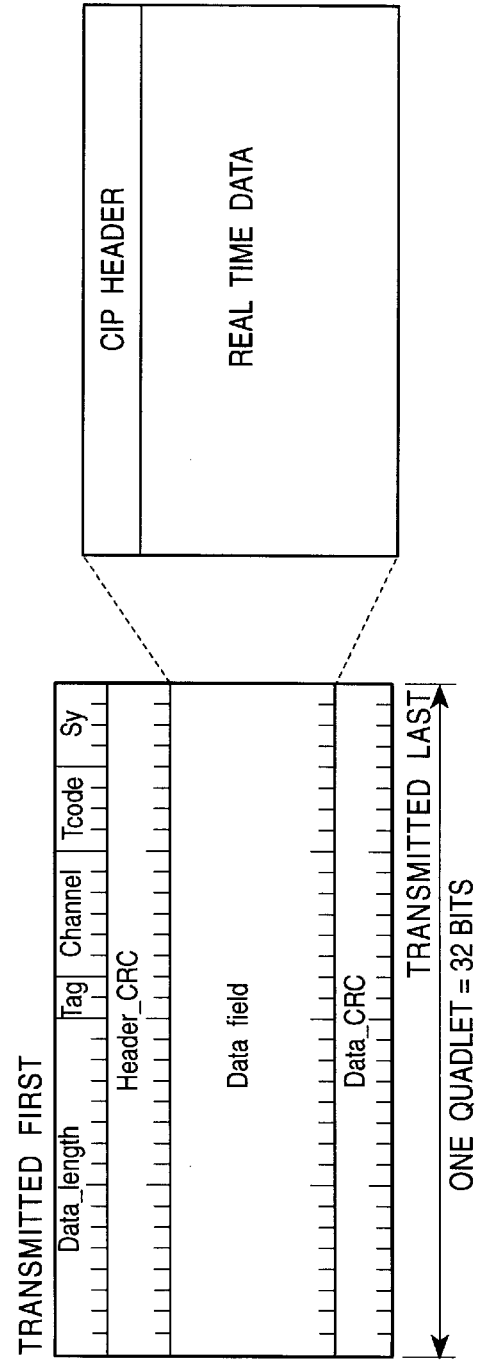
FIG. 22 is a diagram showing the structure of a packet for isochronous communication.

FIG. 18 shows an example of a CIP header format and a data block format used in the fourth embodiment. As shown in FIG. 18, the same CIP header format as the conventional one having no SYT area as shown in FIG. 26 may be used. In this example, the value in the DBS area is 00001001 (binary), the value in the FN area is 11 (binary) and the value in the QPC area is 111 (binary). Therefore, the data block length is 9 quadlets, i.e., 36 bytes, the number of fractions in which one pack is divided is 8 ($=2^3$), and the padding data length is 7 quadlets, i.e., 28 bytes.

The packeting circuit 45 sets a number of data blocks per packet according to the band, forms a packet using the number of data blocks corresponding to the set number, and outputs the formed packet to the communication control section 49.

The communication control section 49 outputs a control signal to the timer 47 in every 125 μsec cycle at the start of the cycle, and simultaneously outputs a cycle sync signal and a cycle start packet to the communication section 50. Also, the communication control section 49 is supplied with packets from the packeting circuit 45 and outputs the packets to the communication section 50 one in every cycle.

The communication section 50 transmits, over the AV bus 2, cycle sync signals, start packets and isochronous communication packets supplied from the communication control section 49.

The process ends thereby. The above-described process is repeated the number of times corresponding to the number of packets.

In the above-described manner, MPEG-PS data is converted into isochronous communication packets and the packets are transmitted over the AV bus 2.

The communication section 61 of the digital TV 3 receives cycle sync signals, cycle start packets and isochronous communication packets transmitted from the DVD player 1 via the AV bus 2, and outputs the received signals and packets to the communication control section 62.

When supplied with one cycle sync signal, the communication control section 62 outputs a control signal according to the cycle sync signal to the timer 64, and outputs the corresponding supplied isochronous communication packet to the unpacketing circuit 63.

The unpacketing circuit 63 reads the CIP header of each of supplied isochronous communication packets and restores source packets with added time stamps and padding data each from at least one packet corresponding to $FN_2$ data blocks (eight blocks in this case).

In this embodiment, since the value in the FMT area of each CIP header is set to 100001, the unpacketing circuit 63 performs processing by assuming that data formed as a 2,048-byte MPEG2-PS packet has been divided into 8 source packets, and that each source packet has been further divided to form data blocks.

The unpacketing circuit 63 outputs head 4-byte time stamps to the adder 65, restores the MPEG-PS data pack of 2,048 bytes from 8 (the number of source packets)×8 (the number of data blocks obtained by dividing each source packet) (=64) data blocks, as described below, and outputs the restored MPEG-PS data to the FIFO memory 67.

The method of restoring the MPEG2-PS data pack of 2,048 bytes from the 64 data blocks will next be described. The unpacketing circuit 63 discriminates each of the source packets containing the data blocks on the basis of the value in the DBC area of the corresponding CIP header.

That is, if all the lower six digits of the value in the DBC area of the CIP header of one packet are 0, the first data block contained in the packet is recognized as the head data block in one MPEG2-PS packet. Also, if all the lower three digits of the value in the DBC area of the CIP header of one packet are 0, the first data block contained in the packet is recognized as the head data block in one source packet.

For example, if the value of DBC is XX000000 (binary) (X is 0 or 1), the data block is recognized as the head data block in the first one of eight source packets, i.e., the head data block in one MPEG2-PS data pack.

If the value of DBC is XX001000 (binary), the data block is recognized as the head data block in the second one of eight source packets. If the value of DBC is XX010000 (binary), the data block is recognized as the head data block in the third one of eight source packets. If the value of DBC is XX011000 (binary), the data block is recognized as the head data block in the fourth one of eight source packets. If the value of DBC is XX100000 (binary), the data block is recognized as the head data block in the fifth one of eight source packets. If the value of DBC is XX101000 (binary), the data block is recognized as the head data block in the sixth one of eight source packets. If the value of DBC is XX110000 (binary), the data block is recognized as the head data block in the seventh one of eight source packets. If the value of DBC is XX111000 (binary), the data block is recognized as the head data block in the eighth one of eight source packets.

The unpacketing circuit 63 first restores the eight source packets from the data blocks contained in the packets supplied from the communication control section 62, as described above, then restores the MPEG2-PS data pack of 2,048 bytes, and outputs the restored data pack to the FIFO memory 67. Thus, each source packet divided into 8 blocks can be discriminated by referring to the values in the DBC areas. The restored data is output to the decoding section 22 to be decoded.

FIG. 19 shows the set of values in the CIP header. The value in the SID area is set according to the configuration. The value in the DBS area is 00001001 (binary) (=9 quadlets (=36 bytes)). The value in the FN area is 11 (binary) (=8). The value in the QPC area is 111 (binary) (=7). The value in the SPH area is 1. The value 0 to FF (hexadecimal) (0 to 255) is set in the DBC area. The value in the FMT area is 100001 denoting MPEG2-PS. In the FDF area, a predetermined value is set as desired.

In the fourth embodiment, as described above, an MPEG-PS data pack of 2,048 bytes is divided by using the conventional CIP header to form source packets, groups of data formed by adding time stamps and padding data to the source packets are further divided to form data blocks, and packets each having a predetermined number of data blocks are transmitted, thereby transmitting in an isochronous communication manner the pack of 2,048 bytes to the digital TV 3 operating as a decoder through the digital interface in accordance with the IEEE 1394 standard.

In the above-described fourth embodiment, as described above, each source packet can easily be discriminated, so that the padding area (DVD packet header and the source packet header can be treated independently with respect to source packets containing them. As a result, the usable data area can be increased.

Also, an MPEG2-PS packet can be transmitted in an isochronous transmission manner by using the conventional CIP header. In such a case, an MPEG2-PS packet of 2,048 bytes can be transmitted by being fragmentized into, for example, 36-byte data blocks, thus achieving efficient use of the transmission band.

In the above-described embodiments, data is transmitted between DVD player 1 and digital TV 3. However, needless to say, data can also be transmitted between other apparatuses having data communication sections in accordance with the IEEE 1394 standard.

In the above-described embodiments, 4-byte time stamps are used. However, time stamps of 8 bytes or more and having a byte length of a multiple of 4 may also be used.

In the transmitting apparatus and the transmitting method of the present invention, a pack of 2,048 bytes in data is converted into at least one packet to be transmitted in isochronous communication in accordance with the IEEE 1394 standard. Therefore, 2,048 bytes of data can be communicated by using the digital interface in accordance with the IEEE 1394 standard.

In the receiving apparatus and the receiving method of the present invention, packets transmitted in communication in accordance with the IEEE 1394 standard are received and a pack of 2,048 byte is restored from at least one of the received packets. Thus, 2,048 bytes of data can be communicated by using the digital interface in accordance with the IEEE 1394 standard.

What is claimed is:

1. A transmitting apparatus for transmitting data through a digital interface in accordance with the IEEE 1394 standard; said transmitting apparatus comprising:

conversion means for converting a pack of 2,048 bytes in the data into at least one packet to be transmitted in isochronous communication in accordance with the IEEE 1394 standard; and transmitting means for transmitting the packet;

wherein said conversion means forms data blocks having a byte length of a multiple of 4 by dividing data formed of the pack of 2,048 bytes, a time stamp having a byte length of a multiple of 4 and padding data having a byte length of a multiple of 4 into a number of fractions which is a multiple of 2, and forms the packet by setting a predetermined number of the data blocks per packet to be transmitted as data in the packet.

2. A transmitting apparatus according to claim 1, wherein the byte length of the padding data is a multiple of 4, and a value obtained by dividing the sum of the byte length of the padding data, 2,048 bytes as the byte length of the pack and the byte length of the time stamp by the number of fractions is a multiple of 4.

3. A transmitting apparatus according to claim 1, wherein said conversion means writes the number of fractions and the byte length of the padding data in an FDF area of a CIP header of the packet.

4. A transmitting apparatus according to claim 1, wherein said conversion means writes the number of fractions and the byte length of the padding data in an FN area, a QPC area and a FDF area of a CIP header of the packet.

5. A transmitting apparatus according to claim 1, wherein said conversion means converts the pack into the packet by setting the number of fractions to 8 or less and by setting the byte length of the padding data to 27 or less.

6. A transmitting apparatus according to claim 1, wherein, if the number of fractions is FN, the number of data blocks per packet is DB; and the rate of supply of the data is R bits/second, said conversion means sets the number of fractions and the number of data blocks per packet to values of FN and DB satisfying a condition:

$$\{(2,048*8/((125*0.000001))/FN\}*DB >= R.$$

7. A transmitting apparatus for transmitting data through a digital interface in accordance with the IEEE 1394 standard; said transmitting apparatus comprising:

conversion means for converting a pack of 2,048 bytes in the data into at least one packet to be transmitted in isochronous communication in accordance with the IEEE 1394 standard; and transmitting means for transmitting the packet; wherein said conversion means divides data formed of the pack of 2,048 bytes and padding data having a byte length of a multiple of 4 into a first number of fractions, forms source packets having a byte length of a multiple of 16 by adding a time stamp having a byte length of a multiple of 4 to each of the first number of fractions of the data, forms data blocks having a byte length of a multiple of 4 by further dividing each of the source packets into a second number of fractions which is a multiple of 2, and forms the packet by setting a predetermined number of the data blocks per packet to be transmitted as data in the packet.

8. A transmitting apparatus according to claim 7, wherein said conversion means writes the byte length of the padding data in an FDF area of a CIP header of the packet.

9. A transmitting apparatus according to claim 7, wherein, if the first and second numbers of fractions are FN1 and FN2, respectively; the number of data blocks per packet is DB; and the rate of supply of the data is R bits/second, said conversion means sets the first and second numbers of fractions and the number of data blocks per packet to values of FN1, FN2 and DB satisfying a condition:

$$\{(2048*8/(125*0.000001)/(FN1*FN2)\}*DB >= R.$$

10. A transmitting apparatus for transmitting data through a digital interface in accordance with the IEEE 1394 standard; said transmitting apparatus comprising:

conversion means for converting a pack of 2,048 bytes in the data into at least one packet to be transmitted in isochronous communication in accordance with the IEEE 1394 standard; and transmitting means for transmitting the packet; wherein said conversion means forms data blocks having a byte length of a multiple of 4 by dividing the pack of 2,048 bytes into a number of fractions which is a multiple of 2, forms the packet by setting a predetermined number of the data blocks per packet to be transmitted as data in the packet, and writes a time stamp in an SYT area of a CIP header of the packet.

11. A transmitting apparatus according to claim 10, wherein, if the number of fractions is FN; the number of data blocks per packet is DB; and the rate of supply of the data is R bits/second, said conversion means sets the number of fractions and the number of data blocks per packet to values of FN and DB satisfying a condition:

$$\{(2048*8/(125*0.000001)/FN\}*DB >= R.$$

12. A transmitting apparatus for transmitting data through the digital interface in accordance with the IEEE 1394 standard; said transmitting apparatus comprising:

conversion means for converting a pack of 2,048 bytes in the data into at least one packet to be transmitted in isochronous communication in accordance with the IEEE 1394 standard; and transmitting means for transmitting the packet; wherein said conversion means divides data formed of the pack of 2,048 bytes into a first number of fractions which is a multiple of 2, forms source packets by adding a time stamp having a byte length of a multiple of 4 to each of first number of fractions of the data, forms data blocks having a byte length of a multiple of 4 by further dividing each of the source packets into a second number of fractions which is a multiple of 2, and forms the packet by setting a predetermined number of the data blocks per packet to be transmitted as data in the packet.

13. A transmitting apparatus according to claim 12, wherein a serial number of the first one of the data blocks forming the packet is written in a DBC area of a CIP header of the packet.

14. A transmitting apparatus according to claim 12, wherein said conversion means writes the first number of fractions in a FN area of a CIP header of the packet and writes the byte length of the padding data in QPC area of the CIP header of the packet.

15. A receiving apparatus for receiving data transmitted through a digital interface in accordance with the IEEE 1394 standard, said receiving apparatus comprising:

receiving means for receiving packets transmitted in isochronous communication in accordance with the IEEE 1394 standard; and restoration means for restoring a pack of 2,048 bytes from at least one of the packets received by said receiving means;

wherein said restoration means restores the packets to data formed of the pack of 2,048 bytes, a time stamp having a byte length of a multiple of 4 and padding data having a byte length of a multiple of 4 by reading out the number of fractions and the byte length of padding data written in a FDF area of a CIP header of each of the packets, restoring the data according to the number of fractions, and extracting the time stamp and the pack of 2,048 bytes from the restored data.

16. A receiving apparatus according to claim 15, wherein said restoration means reads out the number of fractions and the byte length of padding data written in a FN area, a QPC area and a FDF area of a CIP header of each of the packets, restores the data according to the number of fractions, and extracts the time stamp and the pack of 2,048 bytes from the restored data.

17. A receiving apparatus for receiving data transmitted through a digital interface in accordance with the IEEE 1394 standard, said receiving apparatus comprising:

receiving means for receiving packets transmitted in isochnonous communication in accordance with the IEEE 1394 standard; and restoration means for restoring a pack of 2,048 bytes from at least one of the packets received by said receiving means;

wherein said restoration means restores the packets to a predetermined number of source packets having a byte length of a multiple of 16, extracts a time stamp from the source packets, and restores the pack of 2,048 bytes from the predetermined number of source packets by reading out the byte length of padding data written in a FDF area of a CIP header of each of the packets, and restoring the pack of 2,048 bytes from the predetermined number of source packets according to the byte length of the padding data.

18. A receiving apparatus for receiving data transmitted through the digital interface in accordance with the IEEE 1394 standard, said receiving apparatus comprising:

receiving means for receiving packets transmitted in isochronous communication in accordance with the IEEE 1394 standard; and restoration means for restoring a pack of 2,048 bytes from at least one of the packets received by said receiving means;

wherein said restoration means reads out a time stamp written in a SYT area of a CIP header of each of the packets.

19. A receiving apparatus for receiving data transmitted through a digital interface in accordance with the IEEE 1394 standard, said receiving apparatus comprising:

receiving means for receiving packets transmitted in isochronous communication in accordance with the IEEE 1394 standard; and restoration means for restoring a pack of 2,048 bytes from at least one of the packets received by said receiving means;

wherein said restoration means restores the packets to a predetermined number of source packets, extracts a time stamp and padding data from the source packets, and restores the pack of 2,048 bytes from the predetermined number of source packets; and wherein said restoration means restores the packets to the predetermined number of source packets on the basis of lower six digits in a DBC area of a CIP header of each of the packets.

20. A transmitting method for transmitting data through a digital interface in accordance with the IEEE 1394 standard; said transmitting method comprising:

a converting step of converting a packet of 2048 bytes into at least a packet to be transmitted by isochronous communication n accordance with the IEEE 1394 standard, and a transmitting step of transmitting said packet;

wherein said converting step forms data blocks having a byte length of a multiple of 4 by dividing data formed of the pack of 2,048 bytes, a time stamp having a byte length of a multiple of 4 and padding data having a byte length of a multiple of 4 into a number of fractions which is a multiple of 2, and forms the packet by setting a predetermined number of the data blocks per packet to be transmitted as data in the packet.

21. A transmitting method according to claim 20, wherein the byte length of the padding data is a multiple of 4, and a value obtained by dividing the sum of the byte length of the padding data, 2,048 bytes as the byte length of the pack and the byte length of the time stamp by the number of fractions is a multiple of 4.

22. A transmitting method according to claim 20, wherein said converting step writes the number of fractions and the byte length of the padding data in a format FDF area of a CIP header of the packet.

23. A transmitting method according to claim 20, wherein said converting step writes the number of fractions and the byte length of the padding data in an FN area, a QPC area and an FDF area of a CIP header of the packet.

24. A transmitting method according to claim 20, wherein said converting step converts the pack into the packet by setting the number of fractions to 8 or less and by setting the byte length of the padding data to 27 or less.

25. A transmitting method according to claim 20, wherein, if the number of fractions is FN; the number of data blocks per packet is DB; and the rate of supply of the data is R bits/second, said converting step sets the number of fractions and the number of data blocks per packet to value of FN and DB satisfying a condition:

$$\{(2048*8/(125*0.000001)/FN\}*DB>=R.$$

26. A transmitting method for transmitting data through a digital interface in accordance with the IEEE 1394 standard; said transmitting method comprising:

a converting step of converting a pack of 2,048 bytes into at least a packet to be transmitted by isochronous communication in accordance with the IEEE 1394 standard, and a transmitting step of transmitting said packet;

wherein said converting step divides data formed of the pack of 2,048 bytes and padding data having a byte length of a multiple of 4 into a first number of fractions, forms source packets having a byte length of a multiple of 16 by adding a time stamp having a byte length of a multiple of 4 to each of the first number of fractions of the data, forms data blocks having a byte length of a multiple of 4 by further dividing each of the source packets into a second number of fractions which is a multiple of 2, and forms the packet by setting a predetermined number of the data blocks per packet to be transmitted as data in the packet.

27. A transmitting method according to claim 26, wherein said converting step writes the byte length of the padding data in an FDF area of a CIP header of the packet.

28. A transmitting method according to claim 26, wherein, if the first and second numbers of fractions are FN1 and FN2, respectively; the number of data blocks per packet is DB; and the rate of supply of the data is R bits/second, said converting step sets the first and second numbers of fractions and the number of data blocks per packet to values of FN1, F2 and DB satisfying a condition:

$$\{(2048*8/(125*0.000001)/(FN1*FN2)\}*DB>=R.$$

29. A transmitting method for transmitting data through a digital interface in accordance with the IEEE 1394 standard; said transmitting method comprising:

a converting step of converting a packet of 2,048 bytes into at least a packet to be transmitted by isochronous communication in accordance with the IEEE 1394 standard, and a transmitting step of transmitting said packet;

wherein said converting step forms data blocks having a byte length of a multiple of 4 by dividing the pack of 2,048 bytes into a number of fractions which is a multiple of 2, forms the packet by setting a predetermined number of the data blocks per packet to be transmitted as data in the packet, and writes a time stamp in an SYT area of a CIP header of the packet.

30. A transmitting method according to claim 29, wherein, if the number of fractions is FN; the number of data blocks per packet is DB; and the rate of supply of the data is R bits/second, said converting step sets the number of fractions and the number of data blocks per packet to values of FN and DB satisfying a condition:

$$\{(2048*8/(125*0.000001)/FN\}*DB>=R.$$

31. A transmitting method for transmitting data through a digital interface in accordance with the IEEE 1394 standard; said transmitting method comprising:
a converting step of converting a pack of 2,048 bytes into it least a packet to be transmitted by isochronous communication in accordance with the IEEE 1394 standard, and a transmitting step of transmitting said packet;
wherein said converting step divides data formed of the pack of 2,048 bytes into a first number of fractions which is a multiple of 2, forms source packets by adding a time stamp having a byte length of a multiple of 4 and padding data having a byte length of a multiple of 4 to each of the first number of fractions of the data, forms data blocks having a byte length of a multiple of 4 further dividing each of the source packets into a second number of fractions which is a multiple of 2, and forms the packet by setting a predetermined number of the data blocks per packet to be transmitted as data in the packet.

32. A transmitting method according to claim 31, wherein a serial number of the first one of the data blocks forming the packet is written in a DB area of a CIP header of the packet.

33. A transmitting method according to claim 31, wherein said converting step writes the first number of fractions in an FN area of a CIP header of the packet and writes the byte length of the padding data in a QPC area of the CIP header of the packet.

34. A receiving method for receiving data transmitted through a digital interface in accordance with the IEEE 1394 standard, said receiving method comprising the steps of:
receiving packets transmitted in isochronous communication in accordance with the IEEE 1394 standard; and
restoring a packet of 2,048 bytes from at least one of the packets received in said step of receiving, a time stamp having a byte length of a multiple of 4 and padding data having a byte length of a multiple of 4 by reading out the number of fractions and the byte length of padding data written in an FDF area of a CIP header of each of the packets, restoring the data according to the number of fractions, and extracting the time stamp and the pack of 2,048 bytes from the restored data.

35. A receiving method according to claim 34, wherein said unpacketing step reads out the number of fractions and the byte length of padding data written in an FN area, a QPC area and an FDF area of a CIP header of each of the packets, restores the data according to the number of fractions, and extracts the time stamp and the pack of 2,048 bytes from the restored data.

36. A receiving method for receiving data transmitted through a digital interface in accordance with the IEEE 1394 standard, said receiving method comprising the steps of:
receiving packets transmitted in isochronous communication in accordance with the IEEE 1394 standard; and
restoring a packet of 2,048 bytes from at least one of the packets received in said step of receiving by restoring the packets to a predetermined number of source packets having a byte length of a multiple of 16, extracting a time stamp from the source packets, and restoring the pack of 2,048 bytes from the predetermined number of source packets, wherein restoring the pack of 2,048 bytes from the predetermined number of source packets includes the steps of reading out the byte length of padding data written in an FDF area of a CIP header of each of the packets, and restoring the pack of 2,048 bytes from the predetermined number of source packets according to the byte length of the padding data.

37. A receiving method for receiving data transmitted through a digital interface in accordance with the IEEE 1394 standard, said receiving method comprising:
a receiving step of receiving packets transmitted in isochronous communication in accordance with the IEEE 1394 standard; and
an unpacketing step of restoring a packet of 2,048 bytes from at least one of the packets received in said receiving step;
wherein said unpacketing step reads out a time stamp written in an SYT area of a CIP header of each of the packets.

38. A receiving method for receiving data transmitted through a digital interface in accordance with the IEEE 1394 standard, said receiving method comprising the steps of:
receiving packets transmitted in isochronous communication in accordance with the IEEE 1394 standard; and
restoring a packet of 2,048 bytes from at least one of the packets received in said step of receiving by restoring the packets to a predetermined number of source packets, extracting a time stamp and padding data from the source packets, and restoring the pack of 2,048 bytes from the predetermined number of source packets, wherein restoring the packets to the predetermined number of source packets is performed on the basis of lower six digits in a DBC area of a CIP header of each of the packets.

39. A transmitting apparatus for transmitting data through a digital interface in accordance with the IEEE 1394 standard, said transmitting apparatus comprising:
a packeting circuit converting a pack of MPEG data into at least one packet to be transmitted in isochronous communication in accordance with the IEEE 1394 standard;
a communication control section for receiving said at least one packet from said packeting circuit, and for transmitting said at least one packet according to a predetermined cycle; and
a communication section for receiving said at least one packet from said communication control section and for transmitting said at least one packet over a communication bus;
wherein said packeting circuit forms data blocks having a byte length of a multiple of 4 by dividing data formed of the pack of 2,048 bytes, a time stamp having a byte length of a multiple of 4 and padding data having a byte length of a multiple of 4 into a number of fractions which is a multiple of 2, and forms the packet by setting a predetermined number of the data blocks per packet to be transmitted as data in the packet.

40. A transmitting apparatus according to claim 39, wherein the byte length of the padding data is a multiple of 4, and a value obtained by dividing the sum of the byte length of the padding data, 2,048 bytes as the byte length of the pack and the byte length of the time stamp by the number of fractions is a multiple of 4.

41. A transmitting apparatus according to claim 39, wherein said packeting circuit converts the pack into the packet by setting the byte length of the padding data to 27 or less.

42. A transmitting apparatus according to claim 39, wherein, if the number of fractions is FN; the number of data blocks per packet is DB; and the rate of supply of the data is R bits/second, said packeting circuit sets the number of fractions and the number of data blocks per packet to values of FN and DB satisfying a condition:

{(2048*8/(125*0.000001)/*FN*}**DB*>=*R*.

43. A transmitting apparatus for transmitting data through a digital interface in accordance with the IEEE 1394 standard, said transmitting apparatus comprising:
- a packeting circuit converting a pack of MPEG data into at least one packet to be transmitted in isochronous communication in accordance with the IEEE 1394 standard;
- a communication control section for receiving said at least one packet from said packeting circuit, and for transmitting said at least one packet according to a predetermined cycle; and
- a communication section for receiving said at least one packet from said communication control section and for transmitting said at least one packet over a communication bus;
- wherein said packeting circuit divides data formed of the pack of 2,048 bytes and padding data having a byte length of a multiple of 4 into a first number of fractions, forms source packets having a byte length of a multiple of 16 by adding a time stamp having a byte length of a multiple of 4 to each of the first number of fractions of the data, forms data blocks having a byte length of a multiple of 4 by further dividing each of the source packets into a second number of fractions which is a multiple of 2, and forms the packet by setting a predetermined number of the data blocks per packet to be transmitted as data in the packet.

44. A transmitting apparatus according to claim 43, wherein said packeting circuit writes the byte length of the padding data in an FDF area of a CIP header of the packet.

45. A transmitting apparatus according to claim 43, wherein, if the first and second numbers of fractions are FN1 and FN2, respectively; the number of data blocks per packet is DB; and the rate of supply of the data is R bits/second, said packeting circuit sets the first and second numbers of fractions and the number of data blocks per packet to values of FN1, FN2 and DB satisfying a condition:

{(2048*8/(125*0.000001)/(*FN1*\**FN2*)}**DB*>=*R*.

46. A transmitting apparatus for transmitting data through a digital interface in accordance with the IEEE 1394 standard, said transmitting apparatus comprising:
- a packeting circuit converting a pack of MPEG data into at least one packet to be transmitted in isochronous communication in accordance with the IEEE 1394 standard;
- a communication control section for receiving said at least one packet from said packeting circuit, and for transmitting said at least one packet according to a predetermined cycle; and
- a communication section for receiving said at least one packet from said communication control section and for transmitting said at least one packet over a communication bus;
- wherein said packeting circuit forms data blocks having a byte length of a multiple of 4 by dividing the pack of 2,048 bytes into a number of fractions which is a multiple of 2, forms the packet by setting a predetermined number of the data blocks per packet to be transmitted as data in the packet, and writes a time stamp in an SYT area of a CIP header of the packet.

47. A transmitting apparatus according to claim 46, wherein, if the number of fractions is FN; the number of data blocks per packet is DB; and the rate of supply of the data is R bits/second, said packeting circuit sets the number of fractions and the number of data blocks per packet to values of FN and DB satisfying a condition:

{(2048*8/(125*0.000001)/*FN*}**DB*>=*R*.

48. A transmitting apparatus for transmitting data through a digital interface in accordance with the IEEE 1394 standard, said transmitting apparatus comprising:
- a packeting circuit converting a pack of MPEG data into at least one packet to be transmitted in isochronous communication in accordance with the IEEE 1394 standard;
- a communication control section for receiving said at least one packet from said packeting circuit, and for transmitting said at least one packet according to a predetermined cycle; and
- a communication section for receiving said at least one packet from said communication control section and for transmitting said at least one packet over a communication bus;
- wherein said packeting circuit divides data formed of the pack of 2,048 bytes into a first number of fractions which is a multiple of 2, forms source packets by adding a time stamp having a byte length of a multiple of 4 and padding data having a byte length of a multiple of 4 to each of the first number of fractions of the data, forms data blocks having a byte length of a multiple of 4 by further dividing each of the source packets into a second number of fractions which is a multiple of 2, and forms the packet by setting a predetermined number of the data blocks per packet to be transmitted as data in the packet.

49. A transmitting apparatus according to claim 48, wherein a serial number of the first one of the data blocks forming the packet is written in a DBC area of a CIP header of the packet.

50. A transmitting apparatus according to claim 48, wherein said packeting circuit writes the first number of fractions in an FN area of a CIP header of the packet and writes the byte length of the padding data in a QPC area of the CIP header of the packet.

51. A receiving apparatus for receiving data transmitted through a digital interface in accordance with the IEEE 1394 standard, said receiving apparatus comprising:
- a receiving communication section for receiving packets transmitted in isochronous communication in accordance with the IEEE 1394 standard;
- a receiving communication control section for receiving said packets from said receiving communication sections, and for transmitting said packets according to a predetermined cycle; and
- an unpacketing circuit for restoring a pack of MPEG data from at least one of the packets received by said receiving means, wherein said restoring a pack of MPEG data includes the operations of restoring the packets to data formed of a pack of 2,048 bytes, a time stamp having a byte length of a multiple of 4 and padding data having a byte length of a multiple of 4 by reading out the number of fractions and the byte length of padding data written in an FN area, a QPC area and an FDF area in a CIP header of each of the packets, restoring the data according to the number of fractions, and extracting the time stamp and the pack of 2,048 bytes from the restored data.

52. A receiving apparatus for receiving data transmitted through a digital interface in accordance with the IEEE 1394 standard, said receiving apparatus comprising:

a receiving communication section for receiving packets transmitted in isochronous communication in accordance with the IEEE 1394 standard;

a receiving communication control section for receiving said packets from said receiving communication section, and for transmitting said packets according to a predetermined cycle; and an unpacketing circuit for restoring a pack of MPEG data from at least one of the packets received by said receiving means by restoring the packets to a predetermined number of source packets having a byte length of a multiple of 16, extracting a time stamp from the source packets, and restoring a pack of 2,048 bytes from the predetermined number of source packets, wherein said restoring a pack of MPEG data includes the operations of reading out the byte length of padding data written in an FDF area of a CIP header of each of the packets, and restoring the pack of 2,048 bytes from the predetermined number of source packets according to the byte length of the padding data.

53. A receiving apparatus for receiving data transmitted through a digital interface in accordance with the IEEE 1394 standard, said receiving apparatus comprising:

a receiving communication section for receiving packets transmitted in isochronous communication in accordance with the IEEE 1394 standard;

a receiving communication control section for receiving said packets from said receiving communication section, and for transmitting said packets according to a predetermined cycle; and an unpacketing circuit for restoring a pack of MPEG data from at least one of the packets received by said receiving means by restoring the packets to a predetermined number of source packets on the basis of lower six digits in a DBC area of a CIP header of each of the packets, extracting a time stamp and padding data from the source packets, and restoring a pack of 2,048 bytes from the predetermined number of source packets.

54. A transmitting method for transmitting data through a digital interface in accordance with the IEEE 1394 standard; said transmitting method comprising:

a packeting step of converting a pack of MPEG data into at least one packet to be transmitted in isochronous communication in accordance with the IEEE 1394 standard;

a transmission controlling step of receiving said at least one packet from said packeting circuit, and transmitting said at least one packet according to a predetermined cycle; and a transmitting step of receiving said at least one packet from said transmission controlling section and transmitting said at least one packet over a communication bus;

wherein said packeting step forms data blocks having a byte length of a multiple of 4 by dividing data formed of the pack of 2,048 bytes, forms a time stamp having a byte length of a multiple of 4 and padding data having a byte length of a multiple of 4 into a number of fractions which is a multiple of 2, and forms the packet by setting a predetermined number of the data blocks per packet to be transmitted as data in the packet.

55. A transmitting method according to claim 54, wherein the byte length of the padding data is a multiple of 4, and a value obtained by dividing the sum of the byte length of the padding data, 2,048 bytes as the byte length of the pack and the byte length of the time stamp by the number of fractions is a multiple of 4.

56. A transmitting method according to claim 54, wherein said packeting step converts the pack into the packet by setting the number of fractions to 8 or less and by setting the byte length of the padding data to 27 or less.

57. A transmitting method according to claim 54, wherein, if the number of fractions is FN; the number of data blocks per packet is DB; and the rate of supply of the data is R bits/second, said packeting step sets the number of fractions and the number of data blocks per packet to values of FN and DB satisfying a condition:

$$\{(2048*8/(125*0.000001)/FN\}*DB>=R.$$

58. A transmitting method for transmitting data through a digital interface in accordance with the IEEE 1394 standard, said transmitting method comprising:

a packeting step of converting a pack of MPEG data into at least one packet to be transmitted in isochronous communication in accordance with the IEEE 1394 standard;

a transmission controlling step of receiving said at least one packet from said packeting step, and transmitting said at least one packet according to a predetermined cycle; and a transmitting step of receiving said at least one packet from said transmission controlling step and transmitting said at least one packet over a communication bus;

wherein said packeting step divides data formed of the pack of 2,048 bytes and padding data having a byte length of a multiple of 4 into a first number of fractions, forms source packets having a byte length of a multiple of 16 by adding a time stamp having a byte length of a multiple of 4 to each of the first number of fractions of the data, forms data blocks having a byte length of a multiple of 4 by further dividing each of the source packets into a second number of fractions which is a multiple of 2, and forms the packet by setting a predetermined number of the data blocks per packet to be transmitted as data in the packet.

59. A transmitting method according to claim 58, wherein said packeting step writes the byte length of the padding data in an FDF area of a CIP header of the packet.

60. A transmitting method according to claim 58, wherein, if the first and second numbers of fractions are FN1 and FN2, respectively; the number of data blocks per packet is DB; and the rate of supply of the data is R bits/second, said packeting step sets the first and second numbers of fractions and the number of data blocks per packet to values of FN1, FN2 and DB satisfying a condition:

$$\{(2048*8/(125*0.000001)/(FN1*FN2)\}*DB>=R.$$

61. A transmitting method for transmitting data through a digital interface in accordance with the IEEE 1394 standard, said transmitting method comprising:

a packeting step of converting a pack of MPEG data into at least one packet to be transmitted in isochronous communication in accordance with the IEEE 1394 standard;

a transmission controlling step for receiving said at least one packet from said packeting step, and transmitting said at least one packet according to a predetermined cycle; and a transmitting step of receiving said at least one packet from said transmission controlling step and transmitting said at least one packet over a communication bus;

wherein said packeting step forms data blocks having a byte length of a multiple of 4 by dividing the pack of 2,048 bytes into a number of fractions which is a multiple of 2, forms the packet by setting a predetermined number of the data blocks per packet to be transmitted as data in the packet, and writes a time stamp in an SYT area of a CIP header of the packet.

62. A transmitting method according to claim 61, wherein, if the number of fractions is FN; the number of data blocks per packet is DB; and the rate of supply of the data is R bits/second, said packeting step sets the number of fractions and the number of data blocks per packet to values of FN and DB satisfying a condition:

$$\{(2048*8/(125*0.000001)/FN\}*DB>=R.$$

63. A transmitting method for transmitting data through a digital interface in accordance with the IEEE 1394 standard, said transmitting method comprising:

a packeting step of converting a pack of MPEG data into at least one packet to be transmitted in isochronous communication in accordance with the IEEE 1394 standard;

a transmission controlling step of receiving said at least one packet from said packeting step, and transmitting said at least one packet according to a predetermined cycle; and a transmitting step of receiving said at least one packet from said transmission controlling step and transmitting said at least one packet over a communication bus;

wherein said packeting step divides data formed of the pack of 2,048 bytes into a first number of fractions which is a multiple of 2, forms source packets by adding a time stamp having a byte length of a multiple of 4 and padding data having a byte length of a multiple of 4 to each of the first number of fractions of the data, forms data blocks having a byte length of a multiple of 4 by further dividing each of the source packets into a second number of fractions which is a multiple of 2, and forms the packet by setting a predetermined number of the data blocks per packet to be transmitted as data in the packet.

64. A transmitting method according to claim 63, wherein a serial number of the first one of the data blocks forming the packet is written in a DBC area of a CIP header of the packet.

65. A transmitting method according to claim 63, wherein said packeting step writes the first number of fractions in an FN area of a CIP header of the packet and writes the byte length of the padding data in a QPC area of the CIP header of the packet.

66. A receiving method for receiving data transmitted through a digital interface in accordance with the IEEE 1394 standard, said receiving method comprising the steps of:

receiving packets transmitted in isochronous communication in accordance with the IEEE 1394 standard;

transmitting according to a predetermined cycle said packets received in said step of receiving; and restoring a pack of MPEG data from at least one of the packets received in said step of receiving by restoring the packets to data formed of a pack of 2,048 bytes, a time stamp having a byte length of a multiple of 4 and padding data having a byte length of a multiple of 4, wherein said restoring a pack of MPEG data includes the steps of reading out the number of fractions and the byte length of padding data written in an FN area, a QPC area and FDF area of a CIP header of said packet, restoring the data according to the number of fractions, and extracting the time stamp and the pack of 2,048 bytes from the restored data.

67. A receiving method for receiving data transmitted through a digital interface in accordance with the IEEE 1394 standard, said receiving method comprising the steps of:

receiving packets transmitted in isochronous communication in accordance with the IEEE 1394 standard;

transmitting according to a predetermined cycle said packets received in said receiving step; and restoring a pack of MPEG data from at least one of the packets received in said receiving step by restoring the packets to a predetermined number of source packets having a byte length of a multiple of 16, extracting a time stamp from the source packets, and restoring a pack of 2,048 bytes from the predetermined number of source packets, wherein said step of restoring a pack of MPEG data includes the steps of reading out the byte length of padding data written in an FDF area of a CIP header of each of the packets, and restoring the pack of 2,048 bytes from the predetermined number of source packets according to the byte length of the padding data.

68. A receiving method for receiving data transmitted through a digital interface in accordance with the IEEE 1394 standard, said receiving method comprising the steps of:

receiving packets transmitted in isochronous communication in accordance with the IEEE 1394 standard;

transmitting according to a predetermined cycle said packets received in said receiving step; and restoring a pack of MPEG data from at least one of the packets received in said step of receiving by restoring the packets to a predetermined number of source packets, extracting a time stamp and padding data from the source packets, and restoring a pack of 2,048 bytes from the predetermined number of source packets, wherein said step of restoring a pack of MPEG data includes the step of restoring the packets to the predetermined number of source packets on the basis of lower six digits in a DBC area of a CIP header of each of the packets.

* * * * *